(12) United States Patent
Spitaels et al.

(10) Patent No.: US 7,682,187 B2
(45) Date of Patent: *Mar. 23, 2010

(54) MULTI-PORT MOUNTING BRACKET AND METHOD

(75) Inventors: James S. Spitaels, Shrewsbury, MA (US); Daniel Bryan, Baltimore, MD (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/365,498

(22) Filed: Feb. 4, 2009

(65) Prior Publication Data

US 2009/0142965 A1 Jun. 4, 2009

Related U.S. Application Data

(63) Continuation of application No. 10/901,460, filed on Jul. 28, 2004, now Pat. No. 7,488,202.

(51) Int. Cl.
*H01R 13/60* (2006.01)
(52) U.S. Cl. ..................................... 439/532
(58) Field of Classification Search ................. 439/532, 439/652, 535, 502, 362; 361/622; 385/48
See application file for complete search history.

(56) References Cited

U.S. PATENT DOCUMENTS

| | | | |
|---|---|---|---|
| 3,904,265 A | 9/1975 | Hollyday et al. | |
| 4,002,389 A | 1/1977 | Mammel | |
| 4,032,209 A | 6/1977 | Rutkowski | |
| 4,139,254 A | 2/1979 | Hamilton et al. | |
| 4,722,580 A | 2/1988 | Kocher et al. | |
| 4,761,145 A | 8/1988 | Goto et al. | |
| 4,842,547 A | 6/1989 | Defibaugh et al. | |
| 4,850,897 A | 7/1989 | Hard | |
| 4,948,379 A | 8/1990 | Evans | |
| 5,119,020 A | 6/1992 | Massey et al. | |
| 5,386,344 A | 1/1995 | Beaman et al. | |

(Continued)

FOREIGN PATENT DOCUMENTS

DE 10313358 B3 8/2004

OTHER PUBLICATIONS

International Search Report mailed Jan. 9, 2006.

*Primary Examiner*—Chandrika Prasad
(74) *Attorney, Agent, or Firm*—Lando & Anastasi, LLP

(57) ABSTRACT

A multi-port cabling system for use in installing cable to an equipment rack or enclosure or within an equipment room or data center includes a cabling assembly comprising at least one connector head having a plurality of ports and at least one cable operatively connected to the plurality of ports. The at least one cable terminates internally within the connector head to operatively couple the cable to the plurality of ports. The system further includes a mounting bracket. The mounting bracket and the connector head are each configured for tool-less attachment of one or more cabling assemblies to the bracket. The mounting bracket is further configured to removably mount to an equipment rack or enclosure, and/or to a wall, to thereby install one or more cables. The cabling assembly and the cabling system help to eliminate on-site cable termination and testing during installation of cables to rack-mounted equipment.

24 Claims, 24 Drawing Sheets

U.S. PATENT DOCUMENTS

| | | |
|---|---|---|
| 5,389,006 A | 2/1995 | Noschese |
| 5,507,668 A | 4/1996 | Lambrinos et al. |
| 5,519,173 A | 5/1996 | Newmoyer et al. |
| 5,575,665 A | 11/1996 | Shramawick et al. |
| 5,647,763 A | 7/1997 | Arnold et al. |
| 5,690,511 A | 11/1997 | Melito |
| 5,971,797 A | 10/1999 | Straub et al. |
| 6,106,328 A | 8/2000 | O'Neal |
| 6,106,341 A | 8/2000 | Leach, III |
| 6,139,366 A | 10/2000 | van Woensel |
| 6,146,149 A | 11/2000 | Daoud |
| 6,229,691 B1 | 5/2001 | Tanzer et al. |
| 6,302,728 B1 | 10/2001 | Conorich et al. |
| 6,336,826 B1 | 1/2002 | Kraft |
| 6,358,083 B1 | 3/2002 | Kraft |
| 6,454,597 B1 | 9/2002 | Marsh et al. |
| 6,500,025 B1 | 12/2002 | Moenkhaus et al. |
| 6,780,027 B2 | 8/2004 | Allison |
| 6,780,047 B1 | 8/2004 | Laity et al. |
| 6,830,466 B2 | 12/2004 | Mendoza |
| 6,840,795 B1 | 1/2005 | Takeda et al. |
| 6,885,796 B2 | 4/2005 | Lubkert et al. |
| 6,939,174 B2 | 9/2005 | Wu |
| 6,974,911 B2 | 12/2005 | Hyde |
| 6,981,893 B2 | 1/2006 | Barker et al. |
| 7,070,445 B2 | 7/2006 | Shah et al. |
| 7,112,086 B1 | 9/2006 | Wu |
| 7,134,908 B2 | 11/2006 | Wu |
| 2001/0023146 A1 | 9/2001 | Verbeek et al. |
| 2001/0024904 A1 | 9/2001 | Fischer |
| 2001/0046806 A1 | 11/2001 | McCoy et al. |
| 2003/0236020 A1 | 12/2003 | Iamartino et al. |
| 2005/0176290 A1 | 8/2005 | Lichtscheidl et al. |

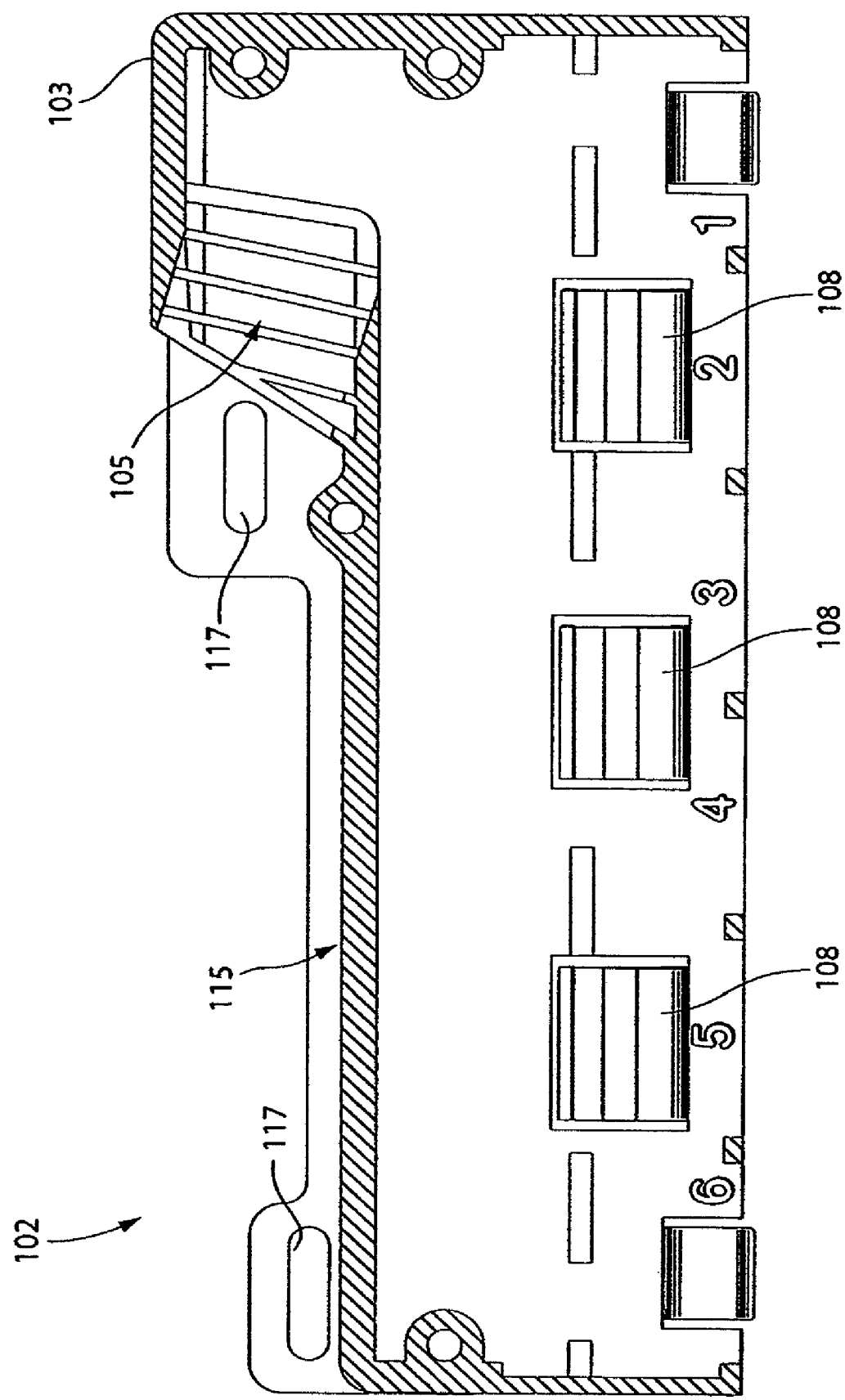

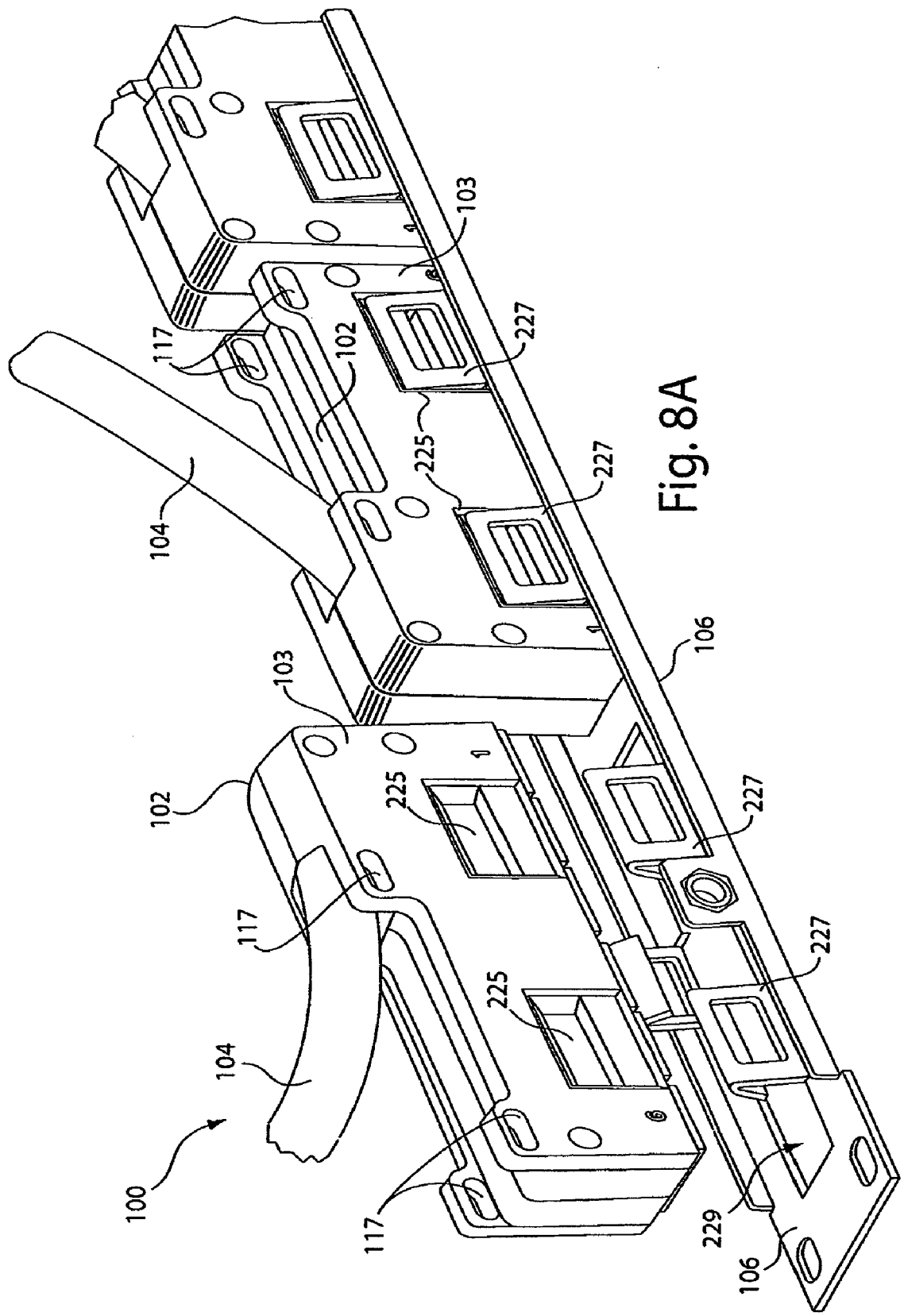

MULTI-PORT MOUNTING BRACKET AND METHOD

RELATED APPLICATIONS

This application claims the benefit under 35 U.S.C. § 120 of U.S. application Ser. No. 10/901,460, entitled "MULTI-PORT CABLING SYSTEM AND METHOD," filed on Jul. 28, 2004, which is herein incorporated by reference in its entirety.

BACKGROUND OF INVENTION

1. Field of Invention

The invention relates to cable installation and management in an equipment rack or enclosure.

2. Discussion of Related Art

Configuration of equipment rooms and data and network centers to create effective IT environments presents a number of challenges. Integration of servers, networking equipment and storage devices, for instance, requires careful planning to configure an environment that can address current as well as future and varying requirements. Such requirements can include signal speeds, power densities, cooling and flexibility with respect to rack equipment architecture. Ideal solutions to meet such requirements are quick and easy to install such that new configurations, equipment, and systems can be deployed with minimal equipment downtime and without substantial cost.

Cable management systems, equipment and techniques used to configure racks and to provide service connections to rack-mounted equipment and to provide inter-rack connections are generally standard components that are universally employed by equipment manufacturers and end-users. For instance, rack-mountable patch panels are typically used for cable termination and provide a plurality of ports for connection of equipment components to cable. Commonly, patch panels facilitate connection of ports to cable conductors via one or more 110-style punch down blocks disposed along the rear of the patch panel. All incoming cable conductors are terminated to connections along the punch down block, often using a punch down tool. Cable termination is commonly conducted on-site within an equipment room or data center and thereafter requires testing to ensure compliance with applicable performance standards.

Such patch panels can have a massive number of cables such that installing and managing these cables is a significant task. Wire termination to punch down blocks requires a technician and is time-consuming, often contributing substantially to installation costs. Patch panel cable installations are typically considered "built-in" and are essentially permanent configurations as relocating such installations, for instance, during reconfiguration of racks or equipment rooms is often inconvenient and difficult.

In addition, the integrity of the cables must be maintained during cabling through and between racks and where configuring the cables with cable management hardware. Care must be taken to prevent kinking of cables and to prevent cables from being bent tighter than the allowable minimum bend radius for the type of cable. Excessive bending and kinking can cause permanent damage that adversely affects cable performance.

SUMMARY OF INVENTION

In general, in an aspect, the invention provides a cabling assembly for use with an equipment rack or enclosure comprising a connector head including a housing and a plurality of ports. The housing is constructed and arranged to support the plurality of ports such that each port is accessible from an area external to the housing. The housing is further constructed and arranged to removably mount to an equipment rack or enclosure. The cabling assembly further includes at least one cable operatively connected to the connector head such that the cable terminates to the plurality of ports internally within the housing.

In general, in another aspect, the invention provides a cabling assembly for use in cable installation comprising a first connector head including a housing and a plurality of ports. The housing is constructed and arranged to support the plurality of ports such that each port is accessible from an area external to the housing. The housing is further constructed and arranged to removably mount to a first equipment rack or enclosure. The cabling assembly further includes a second connector head including a housing and a plurality of ports. The housing of the second connector head is constructed and arranged to support the plurality of ports such that each port is accessible from an area external to the housing. The housing of the second connector head is further constructed and arranged to removably mount to a mounting bracket of the first equipment rack or enclosure, or to a second equipment rack or enclosure. The cabling assembly further includes at least one cable operatively connected at a first end to the first connector head such that the cable terminates to the plurality of ports internally within the housing of the first connector head. The cable is operatively connected at a second and opposite end to the second connector head such that the cable terminates to the plurality of ports internally within the housing of the second connector head.

In general, in a further aspect, the invention provides a cabling system for use with an equipment rack or enclosure comprising a connector head including a housing and a plurality of ports. The housing is constructed and arranged to support the plurality of ports such that each port is accessible from an area external to the housing. The cabling system includes at least one cable operatively connected to the connector head such that the cable terminates to the plurality of ports internally within the housing, and further includes a mounting bracket constructed and arranged to accept and to removably attach the connector head thereto. The mounting bracket is constructed and arranged to removably mount to an equipment rack or enclosure.

In general, in another aspect, the invention provides a prefabricated cabling assembly for use in an equipment rack or enclosure comprising a connector head including a housing and a plurality of ports. The housing is constructed and arranged to support the plurality of ports such that each port is accessible from an area external to the housing, and is further constructed and arranged to removably mount to an equipment rack or enclosure. The prefabricated cabling assembly further includes at least one cable operatively connected to the connector head, and a conductor termination arrangement contained within the housing. The conductor termination arrangement is configured and is disposed to internally terminate the cable within the housing and to operatively couple to the plurality of ports.

In general, in yet another aspect, the invention provides a connector head for use in installing cable in an equipment rack or enclosure comprising a housing constructed and arranged to contain a plurality of ports and to support the plurality of ports such that each port is accessible from an area external to the housing. The housing is further constructed and arranged to removably mount to an equipment rack or enclosure. The connector head includes a conductor termination arrangement contained within the housing. The conductor termination arrangement is configured and is disposed to internally terminate the cable within the housing and to operatively couple to the plurality of ports.

In general, in a further aspect, the invention provides a mounting bracket for use in installing cable in an equipment rack or enclosure. The mounting bracket includes an elongate member defined between a first end and a second end. Each of the first end and the second end is configured for removable attachment of the mounting bracket to an equipment rack or enclosure. The mounting bracket further includes a plurality of mounting configurations spaced along the elongate member. The plurality of mounting configurations is disposed and is configured such that the mounting bracket receives and removably attaches thereto at least one connector head. The connector head includes a plurality of ports and a cable entry configured to receive at least one cable.

In general, in another aspect, the invention provides a cabling kit for use in cable installation for an equipment rack or enclosure. The cabling kit comprises at least one connector head including a housing and a plurality of ports. The housing is constructed and arranged to support the plurality of ports such that each port is accessible from an area external to the housing. The cabling further includes a plurality of cables where each cable is configured to operatively connect to the connector head such that the cable terminates to the plurality of ports. Each cable defines a preselected length within a range of lengths.

Various aspects of the invention may provide one or more of the following capabilities. Cable installation to equipment racks and rack enclosures can be organized such that the number of cables needed to meet service requirements is reduced. A reduced number of cables requires fewer components for installation and management and thereby can help to reduce the need for cable trays and wire management components and hardware. As a result, cable installation can be faster with reduced labor, which often translates into lower installation costs. In addition, a reduced number of cables can help to reduce or eliminate disturbance to active equipment operating in an equipment room or data center during installation. The reduced number of cables can help to minimize the amount of intra-rack and inter-rack space required for cabling and cable management. Further, the reduced number of cables helps to decrease the diameter of, for instance, a cable bundle such that cables can be easily routed in a rack or a cable tray.

A cabling assembly includes a connector head comprising a plurality of ports for termination with cable conductors and for accepting connective wiring of equipment components to thereby operatively connect cables with equipment. The connector head may include any number of ports to help to configure a port count as required or desired for certain applications or installations, as well as for providing quantities of ports for future or varying equipment needs. The connector head includes a housing and one or more cables operatively connected thereto. The housing is constructed and arranged to contain and to align and/or mount one or more jacks such that each jack terminates with conductors of the one or more cables operatively connected to the connector head. Alternatively, or additionally, the housing is constructed and arranged to contain and to align and/or mount one or more intermediate elements, such as, for instance, a printed circuit board or a 110-style punch down block, to which cable conductors are terminated.

The configuration of the housing is not limited and may be sized and configured to terminate any number of cables and any type of cable having any number of conductor pairs, as is required for a particular application. In addition, the housing may be sized and configured to house and to align and/or mount any number of jacks and any type of jack appropriate for a certain type of cable, and/or any number and any type of intermediate terminating element, such as a printed circuit board or a 110-style punch down blocks, as described above.

For instance, in one configuration, the housing can be configured to operatively connect to a single, high conductor count twisted pair cable, such as a twenty-four pair communications cable, and can be sized to comprise a number of ports, such as six ports with each port terminating four-pairs of conductors. In this case, use of high conductor count twisted pair cable to comprise the connector head helps to reduce the number of cables required to provide service connections to a rack or enclosure, and thereby helps to reduce the cross sectional area utilized for cables within a rack or enclosure. In addition, using a high conductor count twisted pair cable can ease routing of cable through intra-rack space whereby the cable can be inserted into and along small diameter apertures and openings defined within a rack or enclosure. Also, using a high conductor count twisted pair cable reduces the number of cables routed along inter-rack space such that fewer cables need to be bundled and carried via troughs and ladders between racks to thereby reduce the number of cables and increase the conductor pair count per trough or ladder.

In other configurations, the housing can be configured to operatively connect to two or more cables, and can be sized to comprise any number of ports to terminate a given number of pairs of conductors for each particular type of cable for a certain application.

Alternatively, the housing of the connector head may be configured as a jack having one or more ports as is required or desired to terminate a particular type of cable to provide service connections to a rack or enclosure.

The connector head may be constructed and arranged to contain and to support termination within an interior of the connector head housing such that cable conductors are terminated internally within the housing. Terminating conductors internally helps to protect service connections from environmental dirt and from damage during installation and operation.

The cabling assembly may include a prefabricated connector head with at least one cable operatively connected to the connector head that is terminated, assembled and tested prior to installation. In one configuration, the cable may be terminated and assembled with a conductor termination arrangement, e.g., having one or more jacks, that is ultimately disposed internally within the connector head to operatively couple the cable with the plurality of ports. The terminated cable and the conductor termination arrangement may be subsequently tested and assembled within the connector head, although not necessarily in that order. The cable and the connector head are thereby preterminated and pretested prior to installation of the cabling assembly. The termination, assembly and testing of the cabling assembly may be conducted in a manufacturing situation or at a factory site where conditions for configuration of the cabling assembly are controlled. An end-user may easily and quickly deploy the preterminated and pretested cabling assembly to a rack or enclosure to thereby install the cable to the rack or enclosure without a technician or use of tools. In addition, the prefabricated cabling assembly can be configured for wall mounting, e.g., in an equipment room or data center.

The cabling assembly is configured to be accepted by and to be removably attached to a mounting bracket. The mounting bracket may have any of various configurations to receive and to removably mount one or more cabling assemblies vertically or horizontally within a rack or enclosure, and/or to facilitate wall-mounting of cabling assemblies within an equipment room or data center. The connector head is configured to be accepted by the mounting bracket and to removably attach to the mounting bracket without mounting hardware or the use of tools. The mounting bracket is configured to removably attach one or more connector heads such that an end-user can attach and/or remove one or more connector heads to the mounting bracket as needed to provide service connections to a rack or enclosure. The configurations of the mounting bracket and the cabling assembly provide flexibility with respect to the number of ports and the number of cables that can be installed in a rack or enclosure and permit an end-user to increase or decrease installed port counts by adding or removing cabling assemblies. The cabling system thereby helps to easily and quickly install a required or desired number of ports and/or cables to a rack or enclosure for current as well as future or varying equipment and service connection needs.

The connector head of the cabling assembly defines a cable entry configured to receive and to help to connect one or more cables to the connector head. Where the connector head is deployed in a rack or enclosure, the port entry disposes the one or more cables at an angle relative to the connector head such that the cables exit and extend from the connector head at angled orientation toward one of the sides of the rack or enclosure or toward a top or bottom of the rack or enclosure without requiring significant manipulation of the cable. Risks of cable bending and kinking during bundling and management after cable deployment in a rack or enclosure can thereby be reduced, in part, due to the "natural" drape or orientation of the angled cable as it extends away from the connector head and toward one of the sides or toward the top or bottom of a rack or enclosure. In addition, angling the cables helps to increase the ease with which the cables can be bundled and routed and helps to maintain the cables outside of a minimum bend radius appropriate for the type of cable. The connector head thereby helps to ensure cable performance and reliability by helping to reduce bending and kinking of cables extending from the connector head.

A plurality of connector heads can provide scalability and flexibility for future expansion by enabling a plurality of ports to be readily deployed within racks or enclosures such that spare ports are available with reduced installation effort and at reduced cost. In addition, an expandable design provided by a plurality of connector heads of the cabling system can reduce downtime of equipment and data centers during reconfiguration and expansion.

These and other capabilities of the invention, along with the invention itself, will be more fully understood after a review of the following figures, detailed description, and claims.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings:

FIG. 4 is an internal view of a half portion of the housing of the connector head shown in FIG. 3A;

FIG. 8A is a perspective view of a portion of the cabling system shown in FIG. 2.

DETAILED DESCRIPTION

Figure 1:
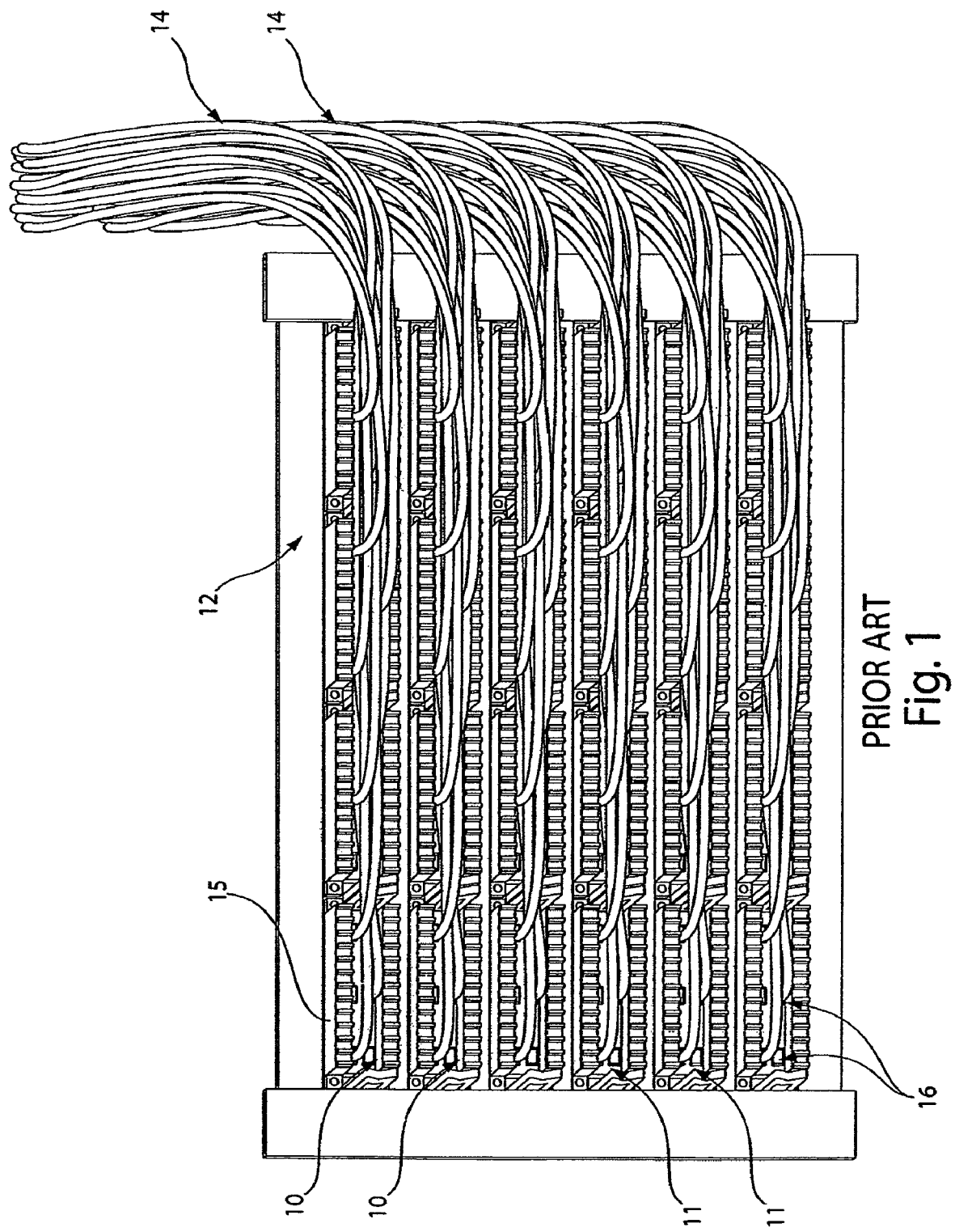
FIG. 1 is a rear view of a portion of an equipment rack with a conventional patch panel.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving" and variations thereof herein, is meant to encompass the items listed thereafter and equivalents thereof as well as additional items.

DETAILED DESCRIPTION OF PREFERRED EMBODIMENTS

The invention provides a cabling system configured for use in rack enclosures and open-frame racks employed in server, telecommunications and networking applications to configure IT environments of equipment rooms, data centers and networking centers. The cabling system according to the invention is configured to be rack-mounted and to provide tool-less installation. The cabling system provides preterminated and pretested wiring to eliminate on-site wire termination and testing during installation and/or during expansion of equipment racks and equipment rooms and data centers. The cabling system includes a rack-mountable cabling assembly including a single unit connector head that receives and terminates at least one cable. The connector head comprises a plurality of ports. Each port is configured to accept connective wiring of individual rack-mounted equipment components to adapt each equipment component to propagate signals through the cable to the port. The connector head thereby operatively connects equipment components to the cable. The cabling system further includes a mounting bracket configured to rack-mount to an equipment rack or enclosure and to accept one or more cabling assemblies. The mounting bracket and the connector head are configured such that one or more connector heads can be removably attached to the mounting bracket without the use of tools or hardware.

The cabling system according to the invention may be configured for inter-rack cable installations. As will become apparent from the discussion of the invention provided below, the cabling system according to the invention is not limited to inter-rack cable installation and may be used to install cable of equipment rooms and data centers, such as Ethernet or other cable, to rack-mounted equipment to help to configure an IT environment. Other embodiments are within the scope of the invention.

Referring to FIG. 1, a conventional cable termination and installation configuration to connect cable 14 with rack-mounted equipment 15 is shown. One or more patch panels 11 are mounted to a rack 12 that provide for common termination via one or more termination blocks 10, commonly referred to in the art as 110-style punch down blocks. Patch panels 11 are typically mounted to the rack 12 via fasteners, e.g., screw/nut combinations. The 110-style punch down blocks 10 define along an outer surface a series of individual connectors 16 to which conductors of the cables 14 are terminated to operatively connect the cables 14 to the rack-mounted equipment 15. For instance, a large number of four-pair cables 14 may be required to only partially configure a rack 12. Each pair of conductors of each cable 14 must be terminated with a pair of connectors 16 and must be tested after termination to install the cable 14. In another instance, a number of high conductor count twisted pair cables may be required for a rack 12. Similarly, each of the pairs of conductors of each cable must be terminated and tested to install the cable. In either instance, terminating and testing conductor pairs of a number of cables presents significant challenges in installing cable to configure a rack or an equipment room. Further challenges can occur with respect to manipulating and routing numerous cables within intra-rack and inter-rack space. Prior art cable installations as shown in FIG. 1, therefore, typically require a technician and are performed on-site. As a result, this type of cable installation is essentially a "built-in" and permanent configuration that prevents a rack or enclosure from being reconfigured and/or relocated without significant inconvenience and difficulty.

Figure 2:
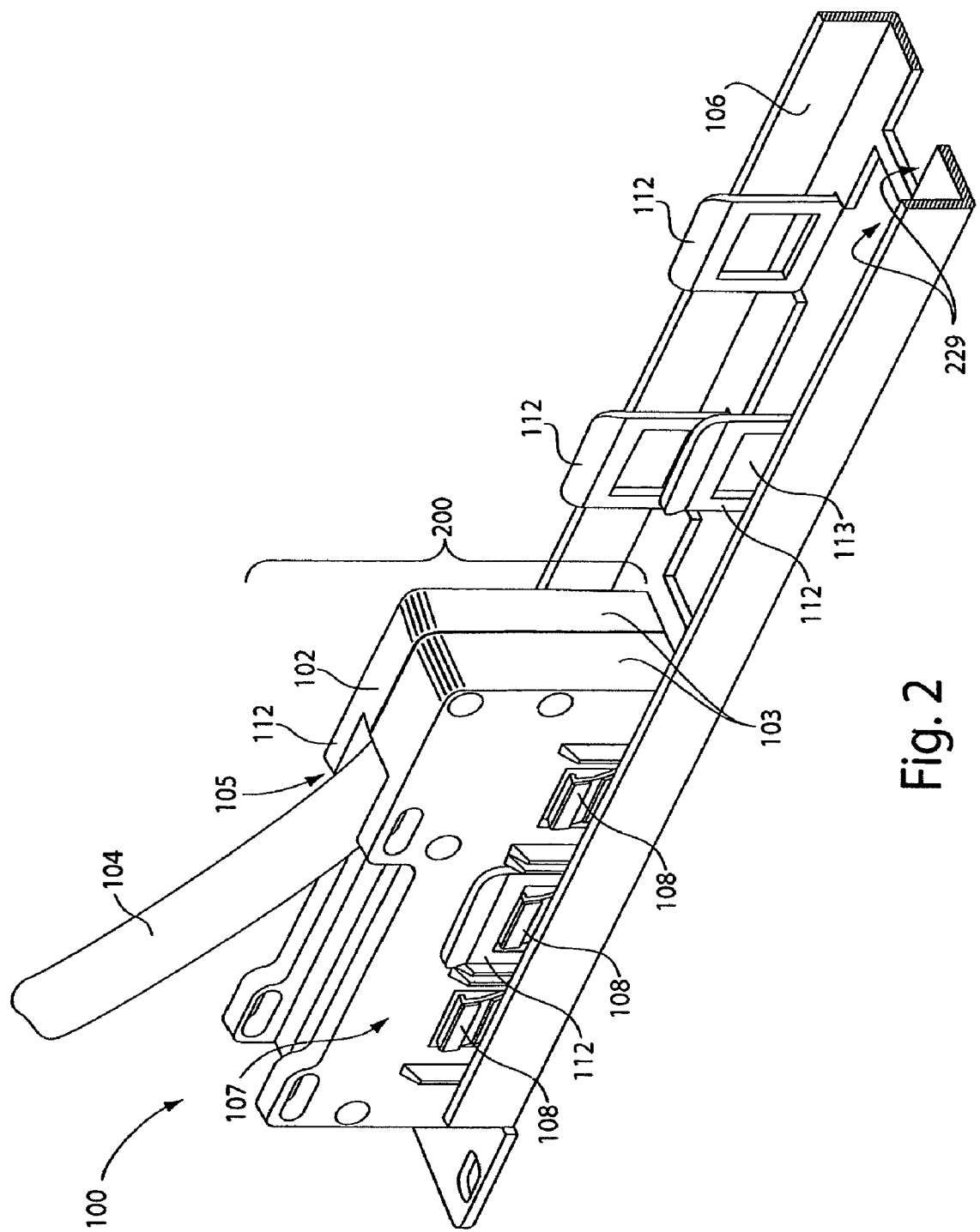
FIG. 2 is a perspective view of a cabling system according to one aspect of the invention.

Referring to FIG. 2, the invention provides a cabling system 100 that helps to eliminate the need for on-site termination and testing to install cable to rack-mounted equipment. In addition, the cabling system 100 provides for tool-less and removable attachment of cable to a rack or enclosure to help to provide flexibility in cable installation and subsequent cable management. Further, the cabling system 100 permits configuration of a required or desired port count to help to provide a cable installation with scalability to accommodate current service connection needs and future expansion of rack configurations.

For purposes of disclosure of the invention, the cabling system 100 is described below in detail with reference to a high conductor count twisted pair cable, such as, for instance, a twenty-four pair communications cable comprising copper wire conductors. The invention is not limited to copper wire communications cable, and anticipates that other types of cable and, in particular, data transmission cable, telephony cable, coaxial cable and fiber optic cable may comprise the cabling system 100.

Figure 3A:
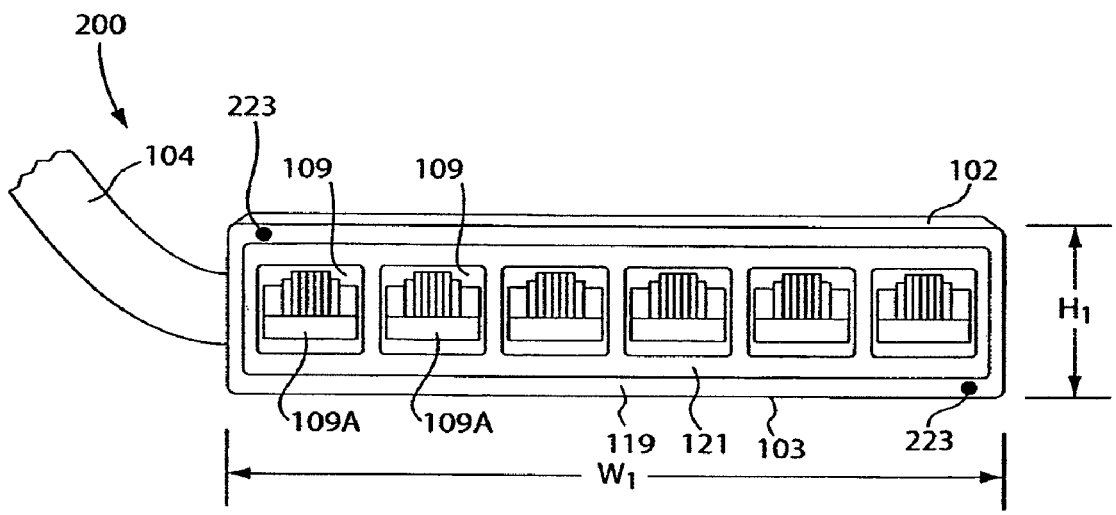
FIGS. 3A and 3B are front views of a cabling assembly of the system shown in FIG. 2 including a connector head and a cable.

Referring to FIG. 3A, and with further reference to FIG. 2, in an aspect, the invention provides the cabling system 100 including a rack-mountable cabling assembly 200 and a mounting bracket 106. The cabling assembly 200 comprises a single unit connector head 102 having a plurality of ports 109 and at least one cable 104 operatively connected to the connector head 102. The mounting bracket 106 is constructed and arranged to serve as a patch panel for the cabling assembly 200 and to accept and removably attach one or more of the cabling assemblies 200 to the bracket 106. The bracket 106 is further configured to removably mount to vertical mounting flanges or rails of a rack or enclosure to horizontally install one or more connector heads 102 and cables 104 to a rack or enclosure. As will be described below in further detail, the cabling system 100 may alternatively include a mounting bracket configured to vertically mount one or more of the cabling assemblies 200 to a rack or enclosure, or a mounting bracket configured to wall-mount one or more of the cabling assemblies to a wall.

The connector head 102 is constructed and arranged to provide the plurality of ports 109 with a desired or required port count and port type to accommodate a particular type of cable 104. Each of the plurality of ports 109 is configured to accept connective wiring of one or more rack-mounted equipment components and to terminate with conductor pairs of the cable 104 to thereby operatively connect the cable 104 to the equipment component.

The connector head 102 includes a housing 103 constructed and arranged to define a height $H_1$ and a width $W_1$ sufficient to contain within its interior one or more jacks 109A that define ports 109. The housing is further configured to align and/or to mount each jack 109A such that conductor pairs of the cable 104 terminate to the internally disposed jack 109A. The connector head 102, and/or the housing 103, according to the invention may be constructed and arranged to accommodate any number of jacks or any type of jack to accommodate termination of any type of cable 104 and to provide service connections to a rack or enclosure as required or desired. As shown in FIG. 3A, in one configuration, the connector head 102 includes six single port jacks 109A. Other configurations of the housing 103 may be constructed and arranged to house two 3-port jacks or one 6-port jack to provide the connector head 102 with the six-port count.

Figure 3B:
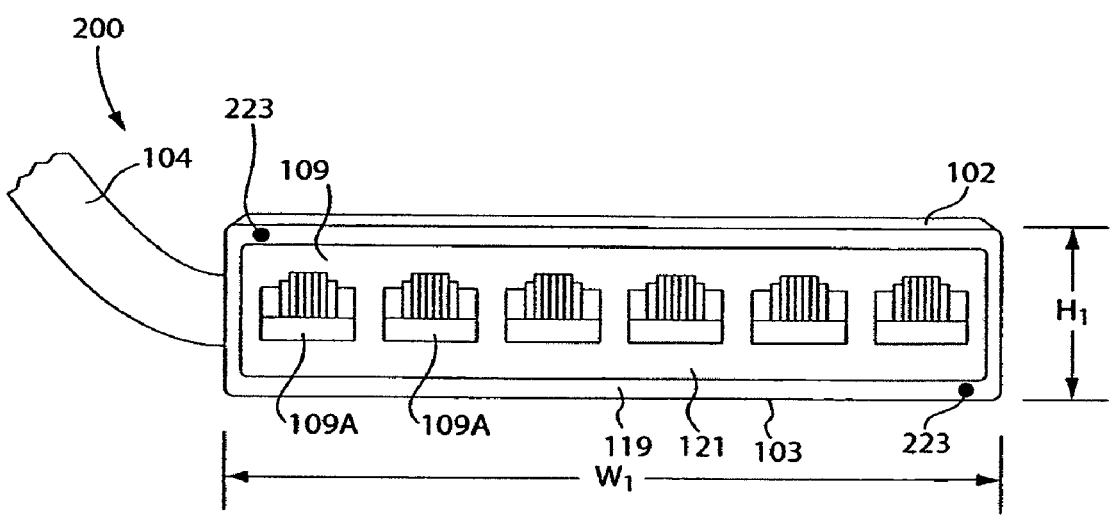

Referring to FIG. 3B, in an alternative configuration, the connector head 103 itself comprises a jack 109A defining one or more ports 109. In this case, the connector head 102 is a single 6-port jack 109A to provide the connector head 102 with the six-port count.

The housing 103 is further configured to orient the plurality of ports 109 such that each port 109 is accessible from an area external to the housing 103. Where the cabling assembly 200 is attached to the mounting bracket 106 and the mounting bracket 106 is rack-mounted, the connector head 102 is disposed within the mounting bracket 106 to permit each of the plurality of ports 109 to be accessible such that the port 109 may receive connective wiring of an equipment component.

As noted above, the connector head 102, and/or the housing 103, may be constructed and arranged to contain any type of jack 109A. For instance, for telephony applications, the jacks 109A can include RJ-11 and/or RJ-12 jacks; for computer networking applications, the jacks 109A can include RJ-45 jacks; for coaxial applications, the jacks 109A can include BNC and/or F connectors; and for fiber optic applications, the jacks 109A can include MTRJ, SC and/or ST connectors, and/or VF-45® connectors available from 3M Company of St Paul, Minn. In addition, the connector head 102, and/or the housing 103, may be constructed and arranged to contain jacks 109A meeting any of a number of compliance standards such as EIATIA, 568A, 568B or any other standard.

The invention is not limited to the type of jack or the number of jacks 109A that the connector head 102, and/or the housing 103, contain and align and/or mount to provide for internal termination, and envisions that the connector head 102, and/or the housing 103, can be constructed and arranged to accommodate any type or number of jacks 109A for termination of a certain number and certain type of cable(s). The invention further anticipates that the connector head 102, and/or the housing 103, can be constructed and arranged to accommodate two or more different types of jacks 109A in a single connector head 102.

In addition, the connector head 102 according to the invention is not limited to the number of cables 104 or to the type of cable that is operatively connected to the connector head 102 and can be constructed and arranged to operatively connect to and terminate any of a number of different types and numbers of cable 104. The cable 104 can include, but is not limited to, copper wire cable, data transmission cable, communications cable, telephony cable, coaxial cable or fiber optic cable. In addition, the invention anticipates that the connector head 102 can be constructed and arranged to accommodate two or more different types of cable 104 in a single connector head 102.

Further, the cable 104 can be, for instance, a Cat 5, Cat 5e or Cat 6 type cable, and can be a shielded or unshielded cable. The cable 104 can have different insulation systems to achieve any of a range of fire resistant properties or ratings. The cable 104 can be, for instance, a room-to-room or floor-to-floor type cable, a riser type cable (CMR) or a plenum type cable (CMP). The cable 104 can also comprise any number of pairs of conductors within a range of from a 1-pair or 2-pair cable up to, for instance, a 100-pair cable. To that end, the connector head 102, and/or the housing 103, is constructed and arranged to house the one or more jacks 109A as required to internally terminate a certain number of pairs of cable conductors required to operatively connect a certain type of cable 104 to the connector head 102 and to the plurality of ports 109.

As shown in FIGS. 2 and 3A, in one configuration of the cabling assembly 200 according to the invention, the cable 104 includes a single twenty-four conductor twisted pair communications cable and the connector head 102 has six ports 109. The housing 103 can be configured to house six single port jacks, two 3-port jacks or one 6-port jack to terminate four pairs of conductors of the cable 104 to each of the six ports 109. As shown in FIG. 3A, the housing 103 is configured to house six single port jacks 109A.

The cabling assembly 200 according to the invention is not limited to the use of jacks 109A to internally terminate the at least one cable 104 to the ports 109 and envisions other conductor termination arrangements to which cables are terminated to operatively connect one or more cables to the plurality of ports 109. For instance, the cabling assembly 200 can be constructed and arranged such that the housing 103 houses one or more jacks 109A operatively connected to one or more printed circuit boards disposed within the housing 103 and to which cable conductors are soldered to terminate the cable 104 to the plurality of jacks 109A and ports 109. In another instance, an alternative termination arrangements includes, the cabling assembly 200 constructed and arranged such that the housing 103 contains one or more 110-style punch down blocks to which cable conductors are terminated to operatively connect the cable 104 to the plurality of ports 109.

The invention is not limited to the configurations shown in FIGS. 2 and 3A and 3B including a single connector head 102 with a cable 104 operatively connected to the head 102, and anticipates that the cabling assembling 200 may comprise other configurations. For instance, the cable 104 can include six 4-pair cables individually jacketed and bound together by a single common jacket to provide a twenty-four pair cable 104 connected to a single connector head 102. In another instance, the cable 104 can include two individual 24-pair bundles bound together by a single jacket, e.g., in a Siamese configuration, to provide a 48-pair cable 104 connected to the single connector head 102. The invention envisions other cable configurations and arrangements such as those described below in further detail.

Referring to FIG. 4, an internal view of one of two halves 107 that define the housing 103 of the connector head 102 is shown. Each of the two halves 107 forms one side of the housing 103 and where the two halves 107 mate with one another, the halves 107 comprise the housing 103. As shown in FIG. 4, and with further reference to FIGS. 2 and 3A, the connector head 102 defines in the housing 103 at least one cable entry 105 that is disposed along the housing 103 and is configured to receive the cable 104. The cable entry 105 is further configured to permit conductor pairs of the cable 104 to be disposed within an interior of the housing 103 of the connector head 102 such that the conductor pairs terminate to one or more internally disposed jacks 109A or, as described above, 110-style punch down blocks or printed circuit boards. Pairs of conductors of the cable 104 are thereby internally terminated within the connector head 102. Enclosing cable termination within the connector head 102 helps to reduce or eliminate any affects of environmental dirt and any risks of damage to cable connections to help to ensure cable performance and reliability.

Figure 5A:
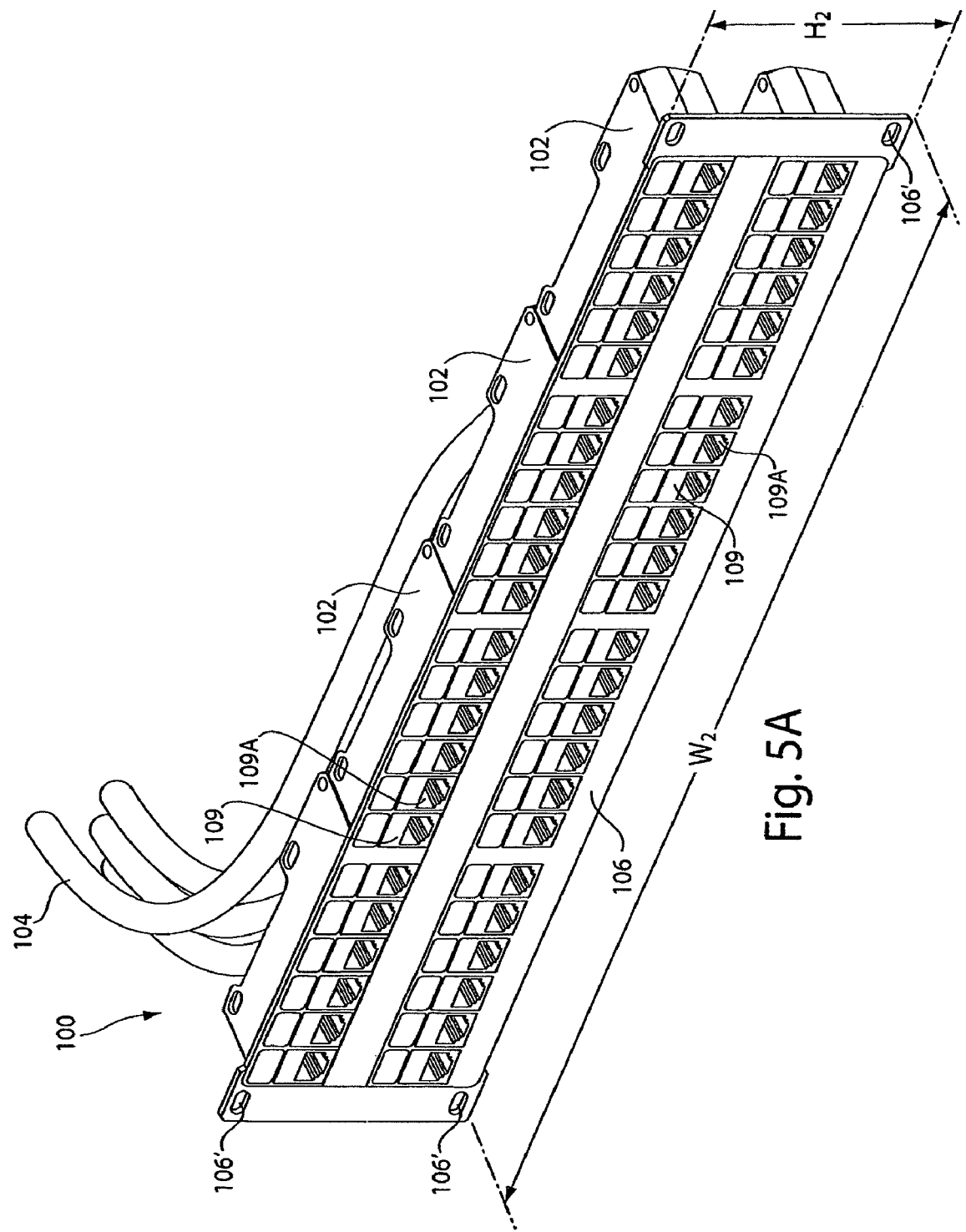
FIG. 5A is a perspective view of a mounting bracket and a plurality of connector heads shown in FIG. 2.

Referring to FIG. 5A, and with further reference to FIG. 2, as noted above, the mounting bracket 106 of the cabling system 100 is constructed and arranged for removable connection to flange(s) or rail(s) of an equipment rack or enclosure. The mounting bracket 106 shown in FIG. 5A, for instance, is constructed and arranged to mount to a pair of adjacent vertical mounting rails of a rack or enclosure, and is configured along each end to define one or more openings 106'. Each opening 106' is sized and is configured to accept a fastener, such as a screw/nut combination. Each opening 106' is further sized and configured such that where the opening 106' is substantially aligned with a mounting aperture (not shown) defined along a flange or rail of a rack or enclosure, the opening 106' and the aperture accept a fastener therethrough to help to mount the bracket 106 to the flange or rail. The invention is not limited to the mounting bracket 106 configured to define one or more openings 106' along each end, and envisions that the mounting bracket 106 can be constructed and arranged to define any configuration or structure to permit the mounting bracket 106 to be removably attached to a rack or enclosure.

The mounting bracket 106 serves as a patch panel and is configured to receive and to mate with at least one cabling assembly 200. As shown in FIG. 5A, for instance, when rack-mounted, the bracket 106 horizontally mounts the cabling assembly 200, and thereby the plurality of ports 109 and the cable 104, between a pair of vertical rails of a rack or enclosure. The connector head 102 of the assembly 200 and the mounting bracket 106 are each configured to mate such that the plurality of ports 109 is disposed at an orientation to receive connective wiring of rack-mounted equipment to connect the cabling assembly 200 to the equipment. As shown in FIG. 2, a series of openings or apertures 229 is defined along the mounting bracket 106 and is disposed such that at least one of the openings or apertures 229 receives one of a plurality of the connector heads 102. Each opening or aperture 229 is sized and configured such that the opening or aperture 229 receives at least a portion of the connector head to position the ports 109 such that the ports 109 are accessible to receive connective wiring from rack-mounted equipment components.

Still referring to FIG. 5A, and with further reference to FIGS. 3A and 3B, the mounting bracket 106 defines a width $W_2$ such that the bracket 106 accepts and mates with one or more cabling assemblies 200, e.g., depending on the dimensions and configuration of the cabling assembly 200. In addition, the width $W_2$ of the mounting bracket 106 permits the bracket 106 to mount between flanges or rails of a standard 19-inch or 23-inch equipment rack or an equipment rack or enclosure of other dimensions. The mounting bracket 106 further defines a standard unit of height $H_2$ or U height (about 1.75 inches) such as, for instance, a 1 U or 2 U height $H_2$, or any fraction thereof such as a 1.5 U height $H_2$. The invention envisions that the mounting bracket 106 can define a width $W_2$ and a U height $H_2$ to permit the bracket 106 to accept and to mate with a number of cabling assemblies 200 to accommodate cabling and port count requirements of a rack or enclosure as may be needed or desired for a particular application.

The number of cabling assemblies 200 that may be attached to the mounting bracket 106 can depend on the dimensions and configuration of each cabling assembly 200 and of the mounting bracket 106. The dimensions and configuration of the cabling assembly 200 can depend, in part, on the types of ports 109, jacks 109A, conductor termination arrangements and/or cable(s) 104 comprising the cabling assembly 200. The connector head 102, for instance, may define a height $H_1$ and a width $W_1$ to accommodate a certain type of cable(s) and port count, and the mounting bracket 106 may be configured to accept and mate with a number of such connector heads 102. For instance, as shown in FIG. 5A, the mounting bracket 106 defines a height $H_2$ of 2 U and the connector head 102 includes, as described above with reference to FIGS. 3A and 3B, six ports 109 and a single twenty-four conductor pair communications cable 104. In this case, the dimensions and the configuration of the connector head 102 and of the mounting bracket 106 permit up to four connector heads 102 to be attached to the mounting bracket 106 per 1 U height. The 2 U bracket 106 can thereby removably mount up to eight cabling assemblies 200 to provide up to forty-eight ports and to install up to eight communications cables 104 to a single rack or enclosure.

Figure 5B:
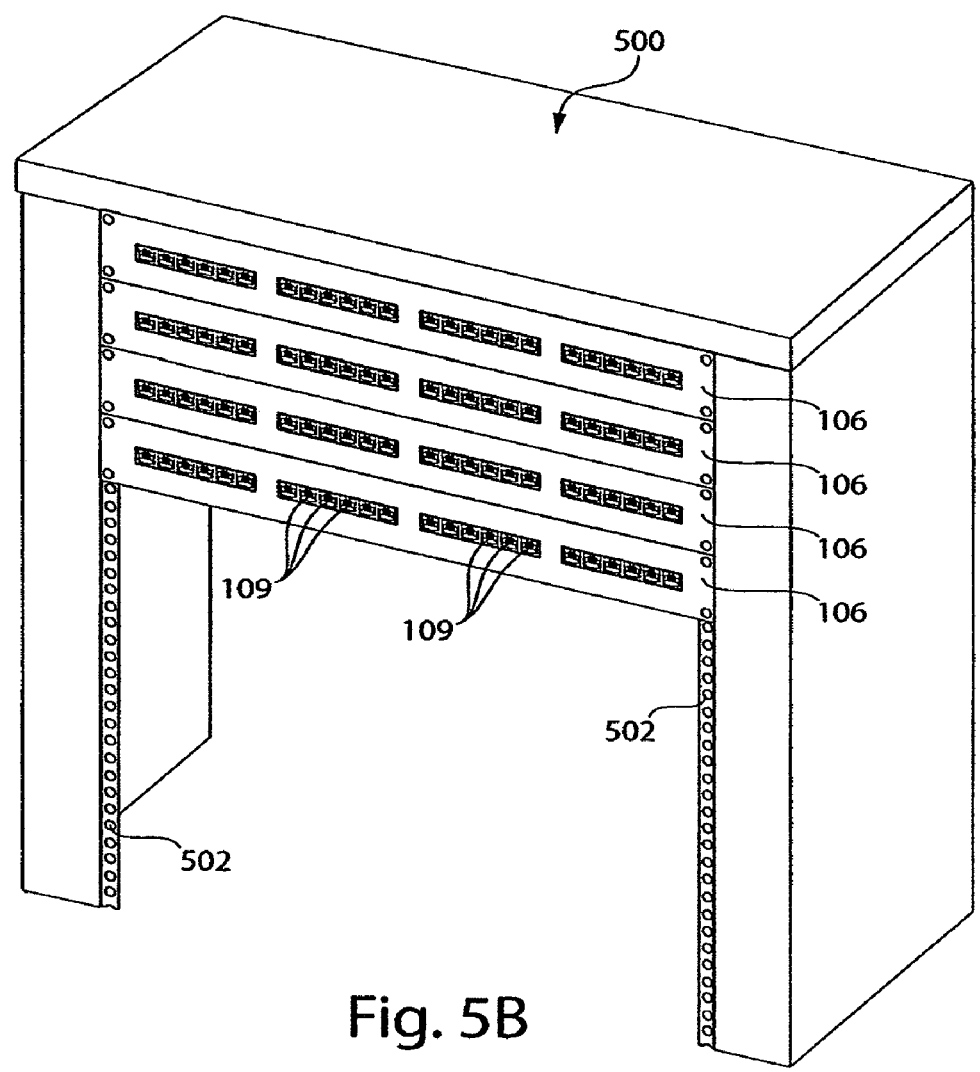
FIG. 5B is a perspective view of a portion of an equipment rack with a plurality of the mounting brackets shown in FIGS. 2 and 5A.

Referring to FIG. 5B, and with further reference to FIGS. 3A and 3B, a perspective view of a portion of a rack enclosure 500 is depicted having four 1 U mounting brackets 106 mounted to a pair of vertical mounting rails 502 of the enclosure 500. Each mounting bracket 106 may, for instance, removably mount up to four cabling assemblies 200. The connector head 102 of each cabling assembly 200 may, for instance, comprise six ports 109 and the single high conductor count twisted pair cable 104, as shown in and described above with reference to FIGS. 3A and 3B. In this case, the cabling system 100 according to the invention provides four 1 U brackets 106, each bracket 106 configured to mate with up to four connector heads 102 to install up to sixteen cabling assemblies 200 and thereby up to sixteen cables 104 and ninety-six ports 109 to the single rack enclosure 500 for connection to rack-mounted equipment.

The configurations and arrangements of the mounting brackets 106 and the cabling assemblies 200 shown in and described with reference to FIGS. 5A and 5B illustrate the flexibility and the scalability of the cabling system 100 according to the invention. As those of ordinary skill in the art can appreciate, cabling assemblies 102 and mounting brackets 106 can be added to and/or removed from a rack enclosure 500 to help to define port counts and to help to configure the rack enclosure 500 to meet equipment requirements. The configuration of each of the connector head 102 and the mounting bracket 106 permit an end-user to removably install the cabling assembly 200 without the use of tools or hardware. An end-user can thereby install as many cabling assemblies 200 as needed to meet current and future needs, as well as can add, remove and/or relocate the cabling assemblies 200 within an active rack or enclosure, or from one rack or enclosure to another, to reconfigure or rearrange ports. In addition, the connector head 102 and the mounting bracket 106 are configured to permit an end-user to removably install a number of cabling assemblies 200 in a single installation to provide a rack or enclosure with a port count and sufficient cabling to furnish spare ports and cables to meet future or varying equipments needs.

Figure 6:
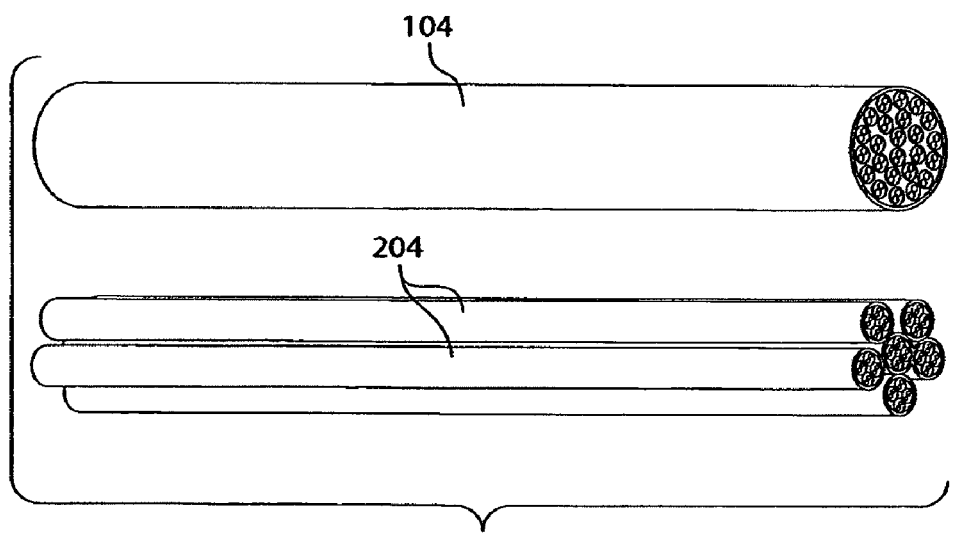
FIG. 6 is a perspective view of a portion of a cable of the cabling assembly shown in FIG. 3A and a portion of a plurality of four-pair cables.

Referring to FIG. 6, and with further reference to FIG. 2, the cable 104 connected to the connector head 102 may include a high conductor count twisted pair cable, e.g., a twenty-four or twenty-five pair cable, and the connector head 102 can comprise a plurality of ports 109. For instance, the cable 104 can include a twenty four pair communications cable 104 terminated to the six ports 109, as shown in and described with reference to FIGS. 2 and 3A. The twenty-four pair communications cable 104 can include, for instance, a telecommunications cable, such as that disclosed in U.S. Pat. No. 5,519,173, to provide high performance signal propagation to rack-mounted telecommunications equipment.

Use of a high conductor count twisted pair cable 104 with the cabling assembly 200 helps to reduce the number of cables comprising a cable installation. Employing the high conductor count twisted pair cable 104 helps to reduce the number of individual cables to be pulled and routed through intra-rack space, or along inter-rack space, and also helps to reduce the extent of cable bundling. In addition, the high conductor count twisted pair cable 104 helps to reduce the number of cables routed via troughs and/or ladders along inter-rack space to thereby help to reduce the number of cables and to increase the number of pairs of conductors per trough or ladder. The high conductor count twisted pair cable 104 also helps to reduce the overall cross sectional area utilized within intra-rack and inter-rack space for cable installation to help to permit efficient use of rack space and, in some installations, to help to maintain or enhance airflow within and between racks or enclosures that rack-mounted equipment components draw from for cooling during operation. The cabling assembly 200 thereby helps to simplify cable installation.

As shown in FIG. 6, many types of cable 204 include 4 pairs of conductors. In this case, six 4-pair cables 204 would be required to provide the equivalent pairs of conductors as a single 24-pair cable, such as the cable 104 described herein in reference to FIGS. 2 and 3A. A single 24-pair cable 104 of the cabling assembly 200 can be routed within a rack or enclosure, between racks or enclosures, and from one rack to another rack in place of six individual 4-pair cables 204. For instance, as described above with reference to FIG. 5, in one configuration, the cabling assembly 200 can be configured to removably mount up to four connector heads 102 to a single mounting bracket 106 to thereby connect up to four 24-pair cables 104. Where each connector head 102 comprises six ports 109, the cabling system 100 can thereby install up to 24 ports and up to 96 pairs of conductors per 1 U of rack height using only four 24-pair cables 104. To provide an equivalent number of conductor pairs to accommodate a 24-port count using 4-pair cables, twenty-four 4-pair cables 204 would be required, comprising 60% greater cross sectional area, to provide a 24-port count to a rack or enclosure. The cabling assembly 200 of the invention thereby helps to reduce the number of cables and the cross sectional area required to provide port counts and service connections to a rack or enclosure. As a result, the cabling assembly 200 helps to reduce the amount of rack space required to route and manage cable, and helps to reduce the size and the number of cable trays and hardware or components typically used for cable management.

Figure 7:
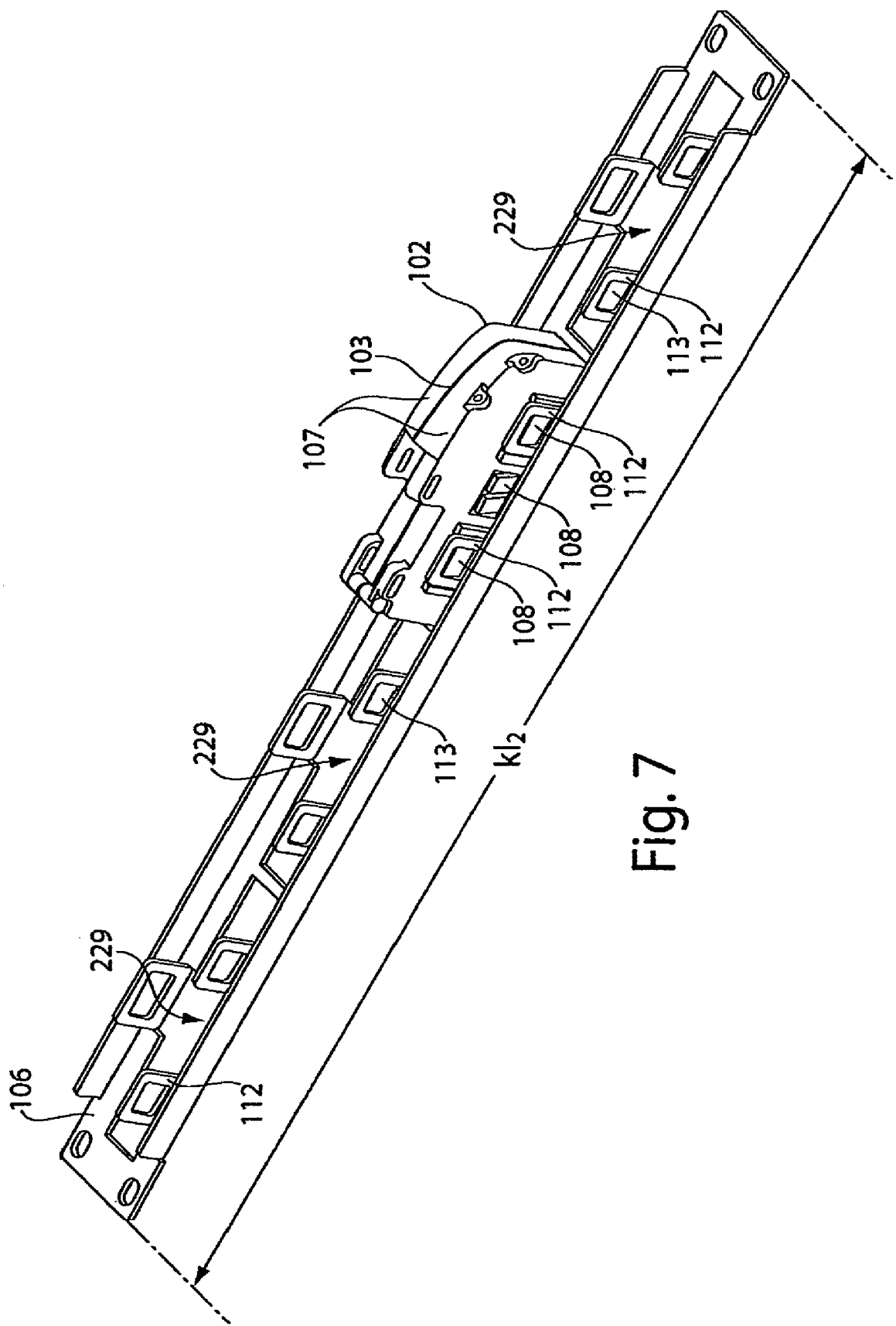
FIG. 7 is a perspective view of the mounting bracket shown in FIGS. 2 and 5B and the connector head shown in FIG. 3A.

Referring to FIG. 7, and with further reference to FIG. 4, the connector head 102 is further constructed and arranged for removable attachment to the mounting bracket 106. In one configuration of the connector head 102, the housing 103 defines along its external surface one or more tabs 108. Each tab 108 is configured to provide for tool-less and removable connection of the connector head 102 to the mounting bracket 106, as will be described below in further detail. The one or more tabs 108 are disposed along the external surface of one or both of the halves 107 of the housing 103, as shown in FIG. 7. Each tab 108 is sized and configured such that any one of a number of mounting flanges 112 disposed along the mounting bracket 106 can couple with at least a portion of one of the tabs 108 and thereby mate with the tab 108 to help to removably attach the connector head 102 to the bracket 106. Each of the mounting flanges 112 disposed along the mounting bracket 106 defines a mounting aperture 113 sized and configured to accept at least a portion of one of the tabs 108 to thereby mate the flange 112 with the tab 108. As shown in FIG. 7, the mounting flanges 112 are spaced along the width $W_2$ of the mounting bracket 106, and the tabs 108 are spaced along one or both of the housing halves 107 such that one or more of the mounting apertures 113 can each accept at least a portion of one of the tabs 108.

Figure 8:
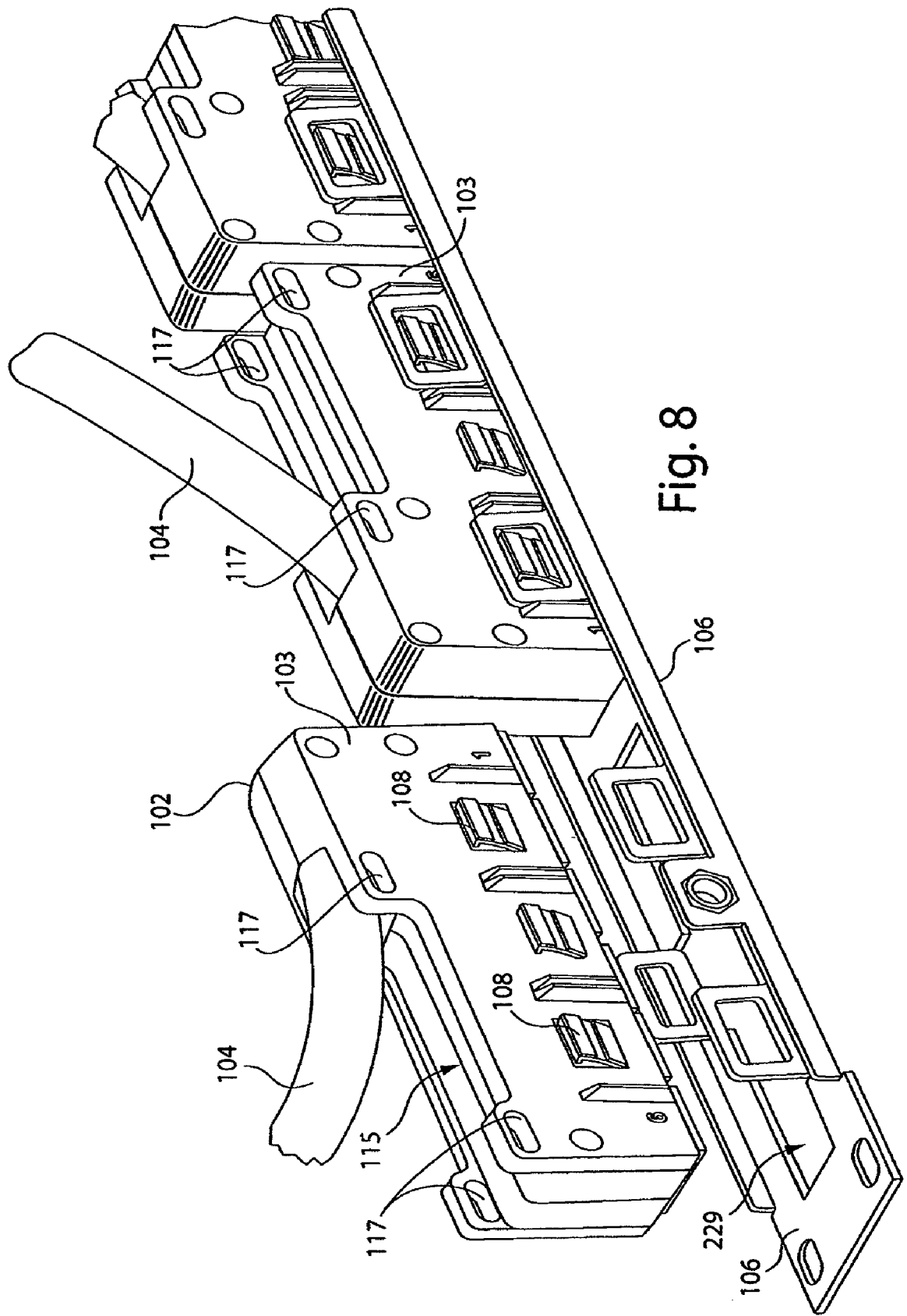
FIG. 8 is a perspective view of a portion of the cabling system shown in FIG. 2.

Referring to FIG. 8, and with further reference to FIG. 7, the tabs 108 are redundant and symmetrically disposed along the external surface of one or both halves 107 of the housing 103 to permit reverse installation of the connector head 102 and thereby the cabling assembly 200 to the mounting bracket 106. As shown in FIG. 8, two connector heads 102 can be attached to the same mounting bracket 106 with each connector head 102 disposed in a reverse direction to the other connector head 102. In addition, the mounting flanges 112 are redundant and symmetrically disposed along one or both sides of the mounting bracket 106 to permit reverse installation of the bracket 106 between a pair of vertical flanges or rails of a rack or enclosure.

With further reference to FIGS. 7 and 8, the mounting flanges 112 are disposed along the mounting bracket 106 and the tabs 108 are disposed along the external surface of the connector head 102 such that the bracket 106 accepts and mates with a number of connector heads 102. In one configuration of the cabling system 100 as shown in FIGS. 7 and 8, the mounting bracket 106 accepts up to four of the connector heads 102.

To install the connector head 102 to the bracket 224, an end-user aligns the connector head 102 with at least a portion of an area defined by one of the openings or apertures 229, mates the lip 223 with a portion of a perimeter edge of the opening or aperture 229, rotates or pivots the lip 223 and thereby rotates or pivots the connector head 102 about the perimeter edge to permit the opening or aperture 229 to receive at least a portion of the connector head 102. The tab 222 is configured such that it biases away from an area external of the connector head 102. An end-user can then apply a pressure or force to the connector head 102 such that in response to the application of such pressure or force, the tab 222 biases inward and slides around a portion of the perimeter edge and of the opening or aperture 229 and mates with a portion of the bracket 224 to thereby attach the connector head 102. Depression of the tab 222 when the connector head 102 is attached to the bracket 224 biases the tab 222 away from the portion of the bracket 224 such that the tab 222 decouples from the bracket 224 to permit the connector head 102 to be removed.

Still referring to FIGS. 7 and 8, installation of the connector head 102 to the bracket 106 is described. An end-user aligns the connector head 102 with at least a portion of an area defined by one of the series of apertures 229 defined along the width $W_2$ of the bracket 106. Each aperture 229 is sized and is configured to receive at least a portion of the housing 103 of the connector head 102 to dispose the connector head 102 with the mounting bracket 106. As shown in FIG. 7, the bracket 106 may define four apertures 229 to dispose up to four connector heads 102. The end-user further substantially aligns the tabs 108 disposed along one side of the housing 103 with the mounting flanges 112 disposed along one side of the bracket 106. The tabs 108 are configured to bias away from the connector head 102. Each tab 108 is further substantially aligned with the mounting aperture 113 of each mounting flange 112. The end-user can then apply a pressure or force to the connector head 102. In response to the application of such pressure or force, each tab 108 is inserted into the mounting aperture 113 and biases inward, sliding around a portion of the perimeter edge of the aperture 113 and mating with a portion of the bracket 106 to thereby attach the connector head 102 to the bracket 106. Depression of the tabs 108 when the connector head 102 is attached to the bracket 106 biases the tab 108 inward towards the connector head 102 such that the tab 108 decouples from the bracket 106 to permit the connector head 102 to be removed.

The invention is not limited to the configuration of the mounting bracket 106, as described above. The mounting bracket 106 according to the invention includes a custom configured bracket 106 that is constructed and arranged to accept a number of connector heads 102 to define a port count and to provide service connections to accommodate cabling requirements of a rack or enclosure. As noted above and described with reference to FIGS. 5A and 5B, the mounting bracket 106 defines a U height $H_2$ and a width $W_2$ and is constructed to removably mount and to provide support for a number of connector heads 102. To provide such support for a plurality of connector heads 102, the configuration of the mounting bracket 106 may define a range of thicknesses such that the bracket 106 provides sufficient support to connector heads 102 for a particular application. The configuration of the mounting flanges 112 of the bracket 106 may remain constant with respect to the bracket 106 configuration such that each of the mounting flanges 112 may accept and mate with at least a portion of one of the tabs 108 despite the range of thicknesses the mounting bracket 106 may define.

The invention is not limited to the configuration and/or the distribution of the tabs 108 of the connector head 102 as shown in FIGS. 4 and 7-8, and envisions that the tabs 108 can be disposed along any of the surfaces of housing 103, such as, for instance, along one or both terminal ends of the housing 103, as will be discussed below in further detail.

In addition, the invention is not limited to the tabs 108 as the attachment or mounting configurations of the connector head 102, and anticipates that the connector head 102 can include other mounting configurations to removably attach the connector head 102 to the mounting bracket 106. For instance, with reference to FIGS. 3A and 3B, in an alternative configuration, the connector head 102 can include one or more mounting holes 223 defined in a front face 119 of the housing 103 and/or the connector head 102 to accept one or more fasteners, e.g., screw/nut combinations, to thereby removably attach the connector head 102 to the mounting bracket 106 via the fasteners. In this configuration, the mounting bracket 106 accordingly includes one or more complimentary configurations, such as, for instance, one or more mounting through holes defined in the bracket 106 and configured to accept at least a portion of the one or more of the fasteners of the connector head housing 103 to removably attach the connector head 102 to the mounting bracket 106.

Referring to FIG. 8A, in another alternative configuration, the connector head 102 can be constructed and arranged to define along the housing 103 one or more mounting apertures 225 or other configurations, and the mounting bracket 106 can define along its width $W_2$ one or more mounting tabs 227. Each of the mounting apertures 225 can be sized and configured such that it can receive at least a portion of one of the mounting tabs 227. Each tab 227 can be sized and configured such that where one of the mounting apertures 225 receives at least a portion of one of the tabs 227, the tab 227 mates with a portion of the mounting aperture 225 to removably attach the connector head 102 to the mounting bracket 106. The mounting apertures 225 and the mounting tabs 227 can be redundant and disposed symmetrically along the connector head 102 and the mounting bracket 106, respectively, to permit reverse installation of the connector head 102 to the mounting bracket 106. Those of ordinary skill in the art can appreciate a range of alternative configurations that can be defined along the connector head 102 and the mounting bracket 106 to permit the connector head 102 to removably attach to the bracket 106 without the use of tools or hardware.

Further, the invention is not limited to the mounting or attachment configurations disposed along or defined in an outer surface of the housing 103 of the connector head 102 to removably attach the connector head 102 to the bracket 106, as described above, and envisions that the connector head 102 can include other internal mounting configurations. For instance, internal mounting configurations may be disposed or defined within an interior of the housing 103, or may be integral with an interior surface or configuration of the housing 103. These internal mounting configurations are disposed and configured within the housing 103 to permit each configuration to removably attach to or mate with a complementary mounting configuration disposed along the bracket 106.

Continuing to refer to FIG. 8, and with further reference to FIG. 4, as noted above, the housing 103 defines the cable entry 105 to receive the cable 104. The cable entry 105 is constructed and arranged such that where the cable entry 105 receives the cable 104, the cable 104 is disposed within the cable entry 105 at an angle, e.g., relative to a top 115 of the housing 103 or the housing 103. In addition, the cable entry 105 can be further constructed and arranged such that the cable 104 exits and extends from the cable entry 105 at an angle relative the top 115 of the housing 103 or the connector head 102. As shown in FIG. 4, in one configuration of the connector head 102, the cable entry 105 is constructed and arranged such that the cable 104 is disposed in the entry 105 at an angle, e.g., less than 90 degrees or an acute angle, relative to the top 115 of the housing 103 or the connector head 102. Further, the cable entry 105 is further constructed and arranged such that the cable 104 exits the cable entry 105 at an angle, e.g., less than 90 degrees or an acute angle, relative to the top 115 of the housing 103 or the connector head 102. The angle at which the cable 104 is disposed within the cable entry 105 and/or the angled exit of the cable 104 help to drape the cable 104 or help to allow the cable 104 to extend, e.g., smoothly or gradually, from the connector head 102 at an orientation toward one of the sides of a rack or enclosure, or toward a top or a bottom of a rack or enclosure, with little or no manipulation applied to the cable 104 to direct its orientation and/or direction. As shown in FIG. 8, connector heads 102 can be oppositely mounted to the bracket 106 such that the cable 104 of a connector head 102 mounted, for instance, left of a center of the mounting bracket 106 extends toward a left side of a rack or upward toward a top or downward toward a bottom of a rack, while the cable 104 of a connector head 102 mounted, for instance, right of the bracket center 106 extends toward a right side of a rack or upward toward a top or downward toward a bottom of a rack.

In addition, the angle at which the cable 104 is disposed within the cable entry 105 and/or the angled exit of the cable 104 provided by the configuration of the cable entry 105 help to provide for cable management through a rack or enclosure by reducing the extent of manipulation of the cable 104 required to route, bundle or otherwise manage the cable 104 once the cable 104 is installed. The angle at which the cable 104 is disposed within the cable entry 105 and/or the angled exit of the cable 104 also help to protect the cable 104 against bending or kinking to ensure that the cable 104 remains outside of a minimum bend radius appropriate for the type of cable 104 that can affect cable performance.

Still referring to FIGS. 4 and 8, the housing 103 further defines one or more slots 117 along one or more edges of, for instance, the top 115 of the housing 103. Each slot 117 is disposed along the housing 103 and is configured to accept a cable tie or other fastener (not shown) to help to secure the cable 104 exiting from the connector head 102, or to help to secure one or more cables 104 exiting from one or more adjacent or proximate connector heads 102. The slots 117 and cable ties help to mechanically support and secure the cable 104 as well as one or more adjacent or proximate cables 104 and help to provide strain relief to the cables 104.

With reference to FIGS. 3A and 3B, the connector head 102 is designed and configured such that it may be constructed and arranged for shielded applications. For instance, the connector head 102 may include shielded ports 109, shielded jacks 109A and a shielded cable 104 to help to meet requirements for a shielded application. The housing 103 or the connector head 102 can include a metal faceplate 121 disposed along the front face 119 of the housing 103 to ground the shielded jacks 109A and ports 109 to the mounting bracket 106. In addition, the housing 103 can be conductively coated to ground the shielded jacks 109A, the shielded ports 109 and the shielded cable 104 to the mounting bracket 106. The invention envisions that other methods and devices may be used to shield the connector head 102, the ports 109, the jacks 109A and the cable 104 to meet requirements for a particular shielded application.

The cabling system 100 and the cabling assembly 200 according to the invention described above with reference to FIGS. 2 through 8 are configured for horizontal mounting of the connector head 102 and the bracket 106 to a pair of adjacent vertical mounting flanges or rails of a rack or enclosure. The invention is not limited to horizontal mounting applications and provides for vertical mounting applications of the cabling system 100 where the connector head 102 is disposed vertically in a rack or enclosure. In addition, the invention is not limited to rack-mounting applications and envisions applications in which the cabling assembly 200 according to the invention is wall-mounted within an equipment room or data center. Vertical mounting and wall mounting applications of the cabling system 100 according to the invention include the connector head 102 and the cable 104 comprising the features and the configurations as described above with reference to FIGS. 2 through 8A.

Figure 9:
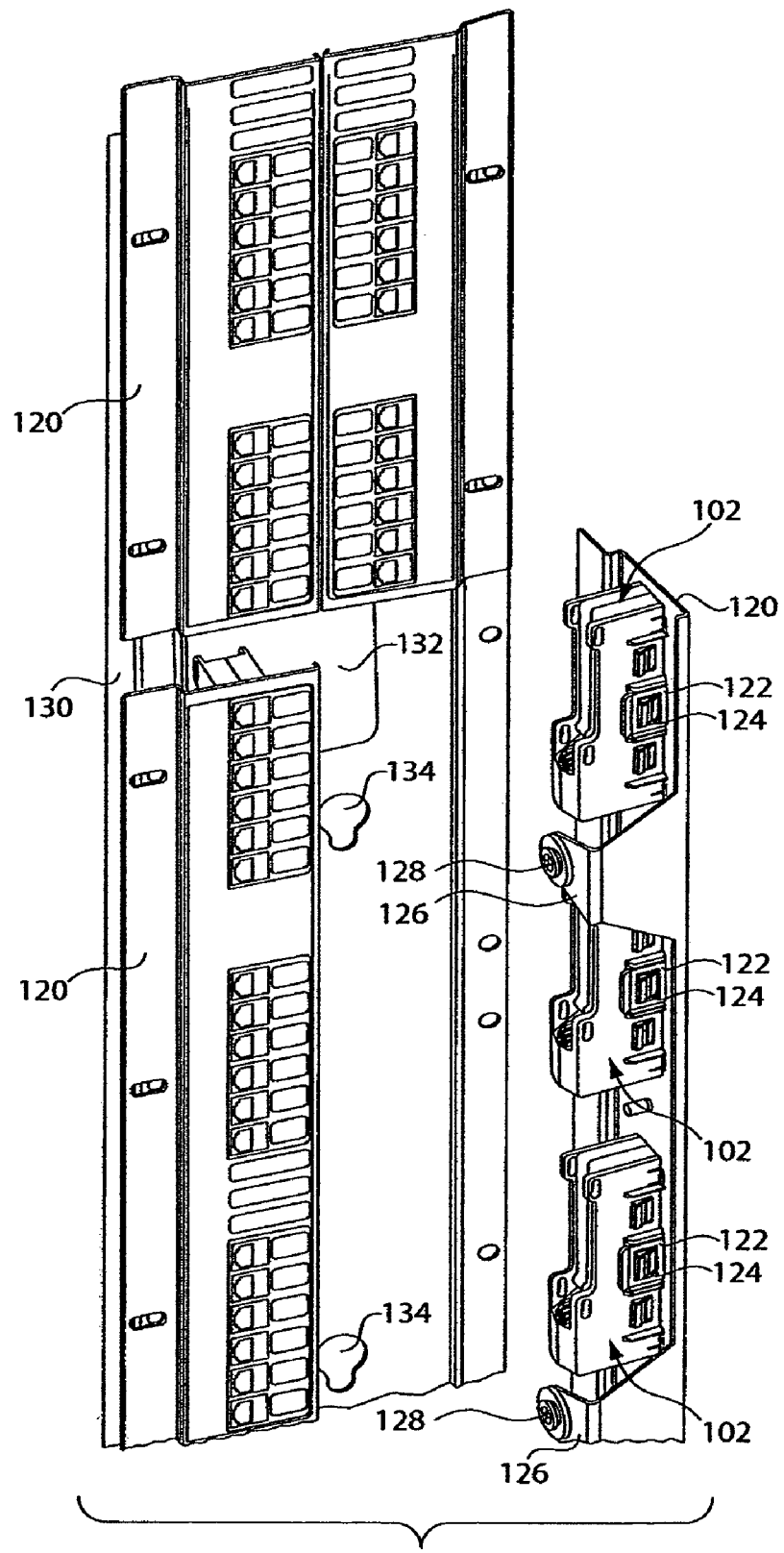
FIG. 9 is a perspective view of a portion of a panel of an equipment rack with a plurality of vertical mounting brackets and a plurality of connector heads shown in FIG. 3A attached to one of the vertical mounting brackets.
Figure 10:
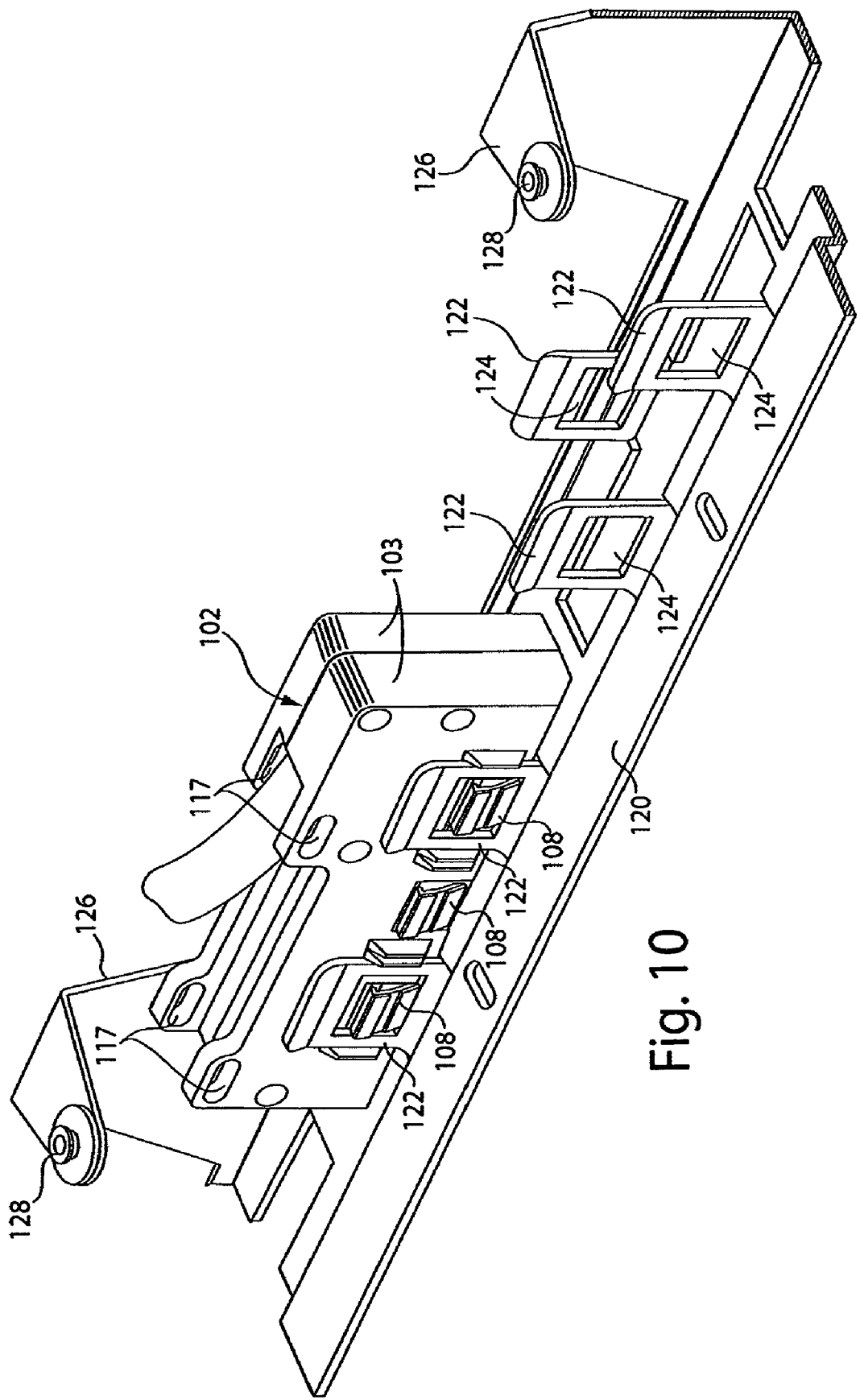
FIG. 10 is a perspective view of a portion of the vertical mounting bracket shown in FIG. 9 with the connector head shown in FIG. 3A.
Figure 11:
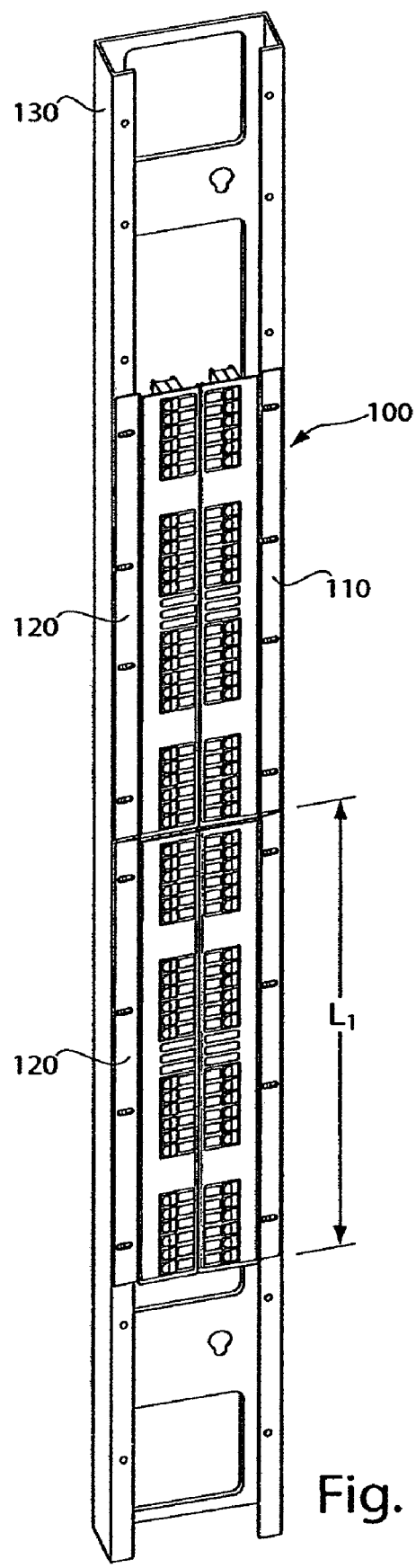
FIG. 11 is a perspective view of the panel shown in FIG. 9 with a plurality of the vertical mounting brackets shown in FIG. 9.

Referring to FIGS. 9-11, in another aspect of the invention, the cabling system 100 includes the connector head 102 and the at least one cable 104, as described above with reference to FIGS. 2-8, and further includes a vertical mounting bracket 120 to vertically mount the cabling assembly 200 to a rack or enclosure. The vertical bracket 120 includes one or more mounting flanges 122 disposed along a length $L_1$ of the bracket 120. Each mounting flange 122 defines a mounting aperture 124 sized and configured to accept at least a portion of one of the tabs 108 disposed along one or both halves 107 of the housing 103 of the connector head 102. The mounting flanges 122 are spaced along the length $L_1$ of the bracket 120 such that any one of the apertures 124 can accept at least a portion of one of the tabs 108 of a connector head 102 to mount the connector head 102 to the vertical bracket 120.

As shown in FIG. 9, the bracket 120 may be configured and sized to mount a number of connector heads 102. For instance, the vertical bracket 120 may be configured and the mounting flanges 120 spaced such that the bracket 106 can receive and mount up to four connector heads 102, wherein each connector head 102 is configured as described above with reference to FIGS. 2 through 4. The mounting flanges 122 are redundant and symmetrically disposed along the mounting bracket 120 to permit reverse installation of the vertical bracket 120 along a left or right side of a rack or enclosure, or along a left or right side of a vertical panel 130 of a rack or enclosure, described below in more detail.

As shown in FIGS. 9 and 10, the vertical bracket 120 may further include one or more, and preferably two, protruding flanges 126, wherein each flange 126 includes a mounting post 128. The protruding flanges 126 and the mounting heads 128 are configured such that an end-user can vertically mount the bracket 120 to a rail or a panel of a rack or enclosure disposed, for instance, along zero U space of the rack or enclosure. A portion of a vertical panel 130 of a rack or enclosure is shown in FIG. 9 that includes a number of openings 132 to permit cables to be routed through the rack or enclosure and a number of mounting apertures 134. The protruding flange 126 and the mounting post 128 may be configured and disposed along the vertical bracket 120 to couple to and to mate with at least a portion of a perimeter edge of one or more of the mounting apertures 134, e.g., such that the vertical bracket 120 hangs along the vertical panel 130, to removably mount the bracket 120 to the vertical panel 130 without tools or hardware.

The bracket 120 shown in FIGS. 9 and 10 can be deployed, as noted above, along zero U space of a number of rack or enclosure designs that typically dedicate zero U space to cable management and power distribution requirements. In particular, the bracket 120 may be readily deployed to vertically and removably mount along zero U space of a rack or enclosure having the vertical panel 130, such as a number of equipment racks and enclosures manufactured by and available from American Power Conversion Corporation of West Kingston, R.I.

The vertical mounting bracket 120 according to the invention may include a custom configured bracket 120 to meet specific needs of an end-user or for a particular connector head 102 or cable 104. As noted above with reference to the horizontal mounting bracket 106, the vertical bracket 120 can be configured for a certain length $L_1$ and can be constructed to support, for instance, a number of connector heads 102. In this case, the bracket 120 can be constructed of any thickness to mount and to provide support for multiple connector heads 102. Despite differences in the bracket 120 thicknesses required to meet specific mounting applications, the configuration of the mounting flange 122 may remain constant such that the cabling system 100 can accommodate a range of bracket 120 thicknesses.

Referring to FIG. 11, a perspective view of the back rack 130 shown in FIG. 9 is provided that depicts four mounting brackets 120 vertically mounted to the panel 130. Each mounting bracket 120 may be configured to accept up to four connector heads 102. Where each connector head 102 is configured with six ports 109 as shown in and described with reference to FIGS. 3A and 3B, each mounting bracket 120 can thereby provide up to 24 ports 109 to a rack or enclosure.

Figure 12:
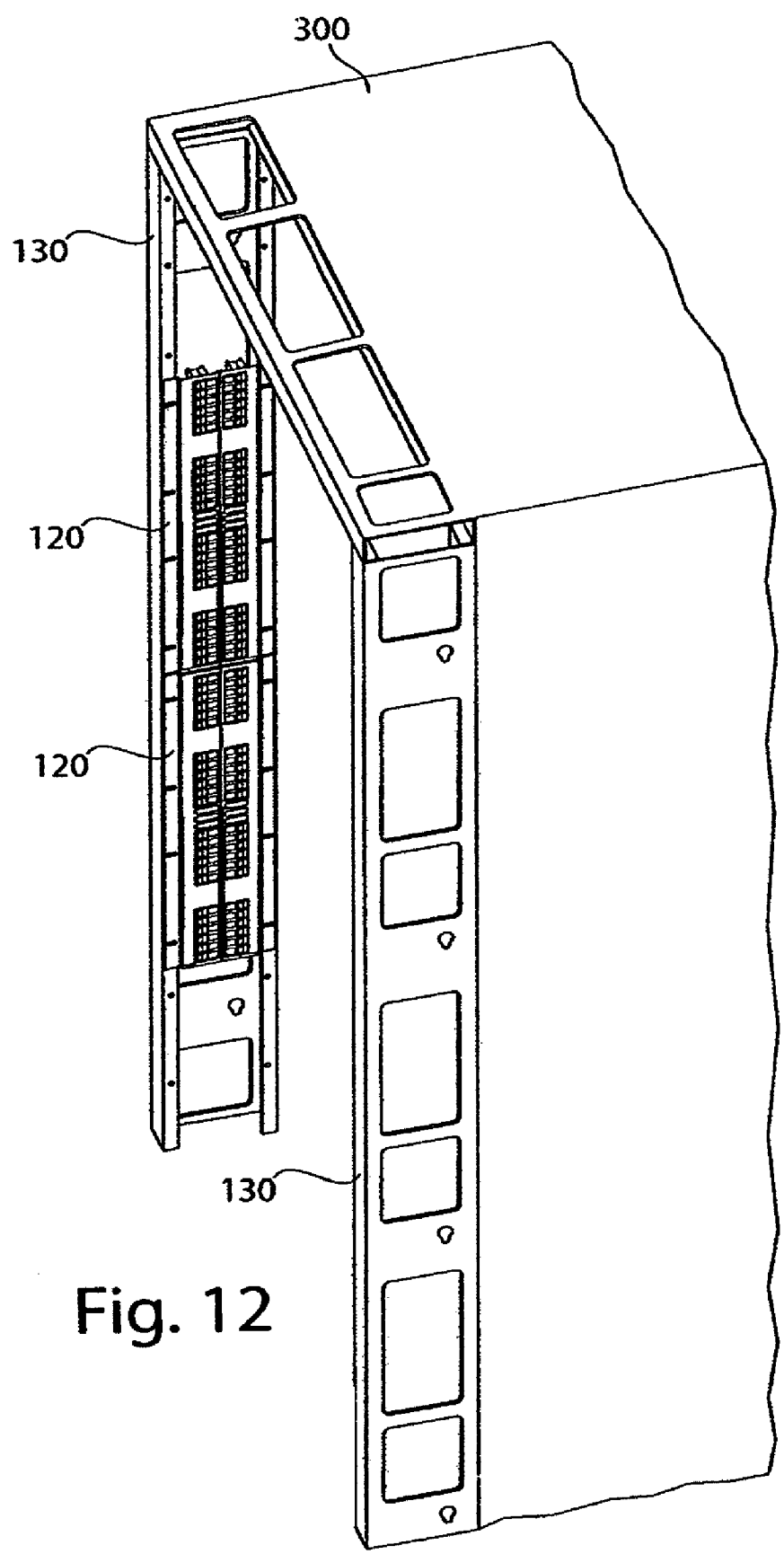
FIG. 12 is a perspective of a portion of an equipment rack with the panel shown in FIG. 9 with a plurality of the vertical mounting brackets shown in FIG. 9.

Referring to FIG. 12, a perspective view of a back portion of a rack enclosure 300 is shown. A plurality of vertical brackets 120 is shown vertically mounted along one of two rack panels 130, e.g., along a left side panel or a right side panel, such as the rack panels that are provided in a number of racks and enclosures manufactured by and available from American Power Conversion Corporation of West Kingston, R.I. Each panel 130 may be configured to removably mount up to six brackets 120, and each bracket 120 may be configured to mount up to four connector heads 102. Each connector head 102 may comprise six ports 109, as well as a high conductor count twisted pair cable 104, as described above. In this context, the six brackets 120 can removably mount up to twenty-four connector heads 102 to thereby install up to twenty-four cables to the rack or enclosure 300. In this configuration, the cabling system 100 can provide up to 144 ports 109 disposed vertically along the panel 130. Alternatively, with six brackets 120 mounted on a left side panel 130 and six brackets 120 mounted on a right side panel 130, with each bracket accepting four connector heads 102 and each connector head 102 comprising six ports 109, the cabling system 100 can provide up to 288 ports 109 disposed vertically along the left and the right panels 130 of the rack or enclosure. Either configuration described above allows the cabling system 100 according to the invention to install a plurality of cables 104 and ports 109 to provide service connections to accommodate current rack needs and to provide for rack expansion and reconfiguration.

Referring to FIGS. 13-18, other configurations of the cabling system 100 and, in particular, of the cabling assembly 200 according to the invention are shown that provide toolless installation of cable to a rack or enclosure and configure a required or desired port count. The configurations shown in FIGS. 13-18 are described herein to illustrate the different constructions that the connector head 102, the cable 104 and/or the mounting bracket 224 can define to accommodate a variety of cabling requirements. The invention is not limited to these constructions and arrangements of the cabling system 100 and the cabling assembly 200, and envisions that other constructions and arrangements of the cabling system 100 and the cabling assembly 200 are possible to accommodate a certain number and a certain type of cable to provide a certain number and a certain type of ports, and to accommodate a certain conductor termination arrangement.

Figure 13:
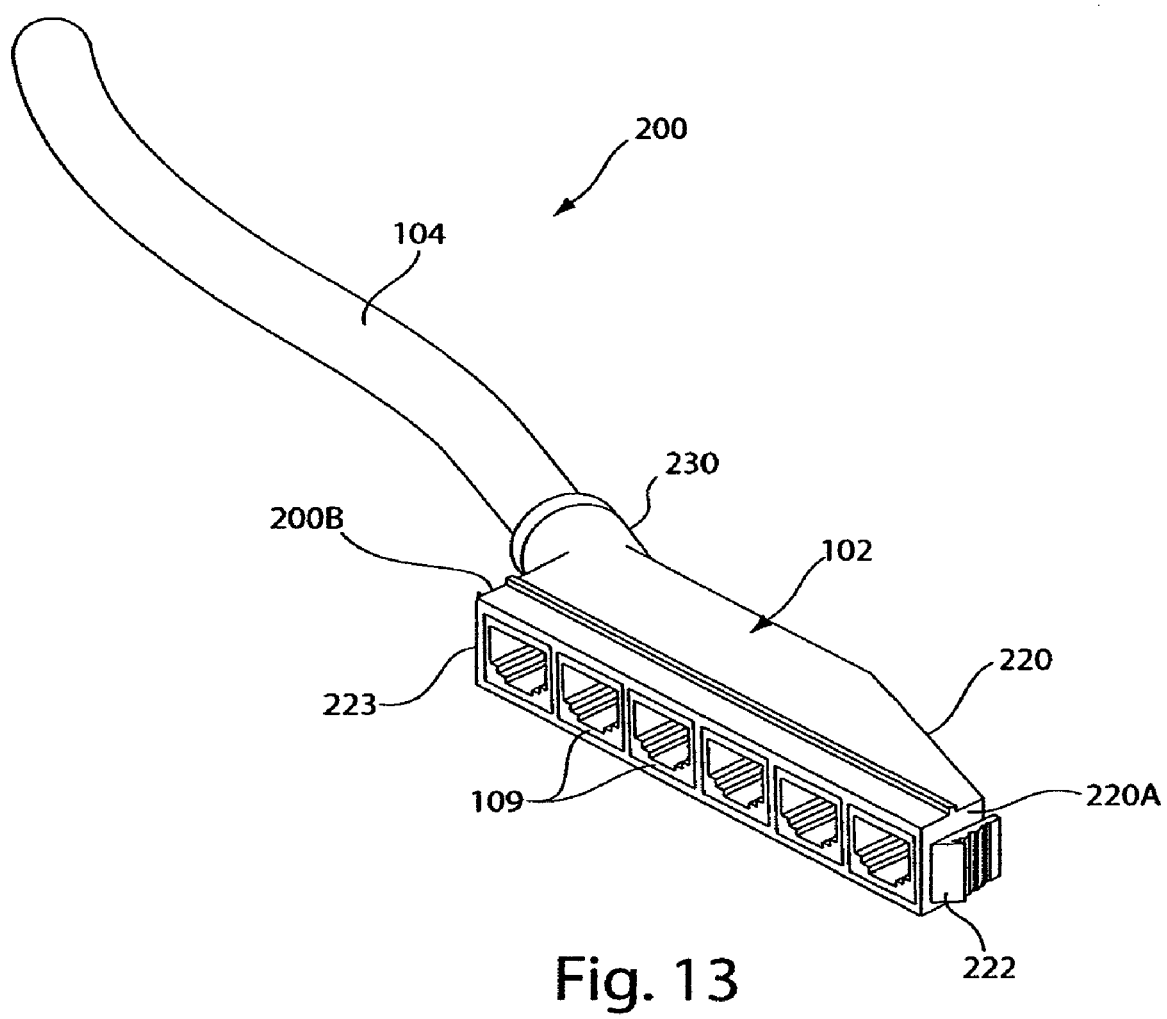
FIG. 13 is a perspective view of another aspect of the cabling assembly according to the invention.
Figure 14:
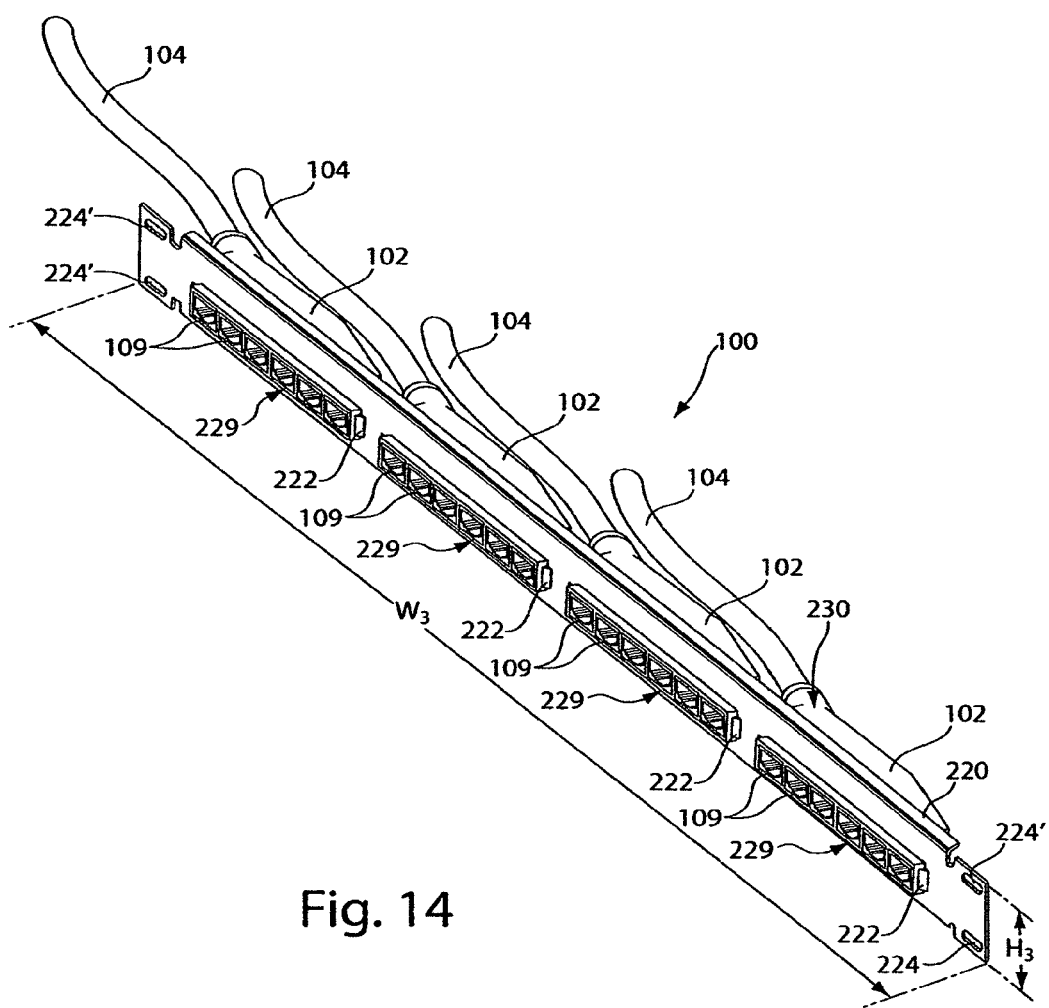
FIG. 14 is a perspective view of a plurality of cabling assemblies shown in FIG. 13 attached to a mounting bracket.

Referring to FIGS. 13 and 14, the cabling assembly 200 includes the connector head 102 and the at least one cable 104 operatively connected to the connector head 102. The connector head 102 comprises a housing 220 constructed and arranged to contain and to support a plurality of ports 109. Similar to the housing 103 described above, the housing 220 is configured to contain within its interior a termination arrangement, e.g., utilizing one or more jacks 109A, printed circuit boards or 110-style punch down blocks, to permit the cable 104 to terminate internally. The connector head 102 as shown in FIG. 13 is not limited to the type of the cable 104, the number of cables or the type and number of ports 109 or jacks 109A. The invention anticipates that the connector head 102 may be configured to accommodate a certain type and number of cables 104 and to accommodate as many ports 109 and jacks 109A, as is required or desired.

The housing 220 is further constructed and arranged to define along at least a first terminal end 220A at least one tab 222. The tab 222 is disposed and is configured to mate with a mounting bracket 224 such that where the tab 222 and the bracket 224 are mated, the connector head 102 is removably attached to the bracket 224. The invention is not limited to the connector head 102 having at least one tab 222 disposed at a first terminal end 220A or at any other position along the housing 103 of the connector head 102, and envisions that one or more tabs 222 can be disposed and configured anywhere along an external surface of the connector head 102 to permit the cabling assembly 200 to removably attach to the mounting bracket 224 shown in FIG. 14 or any other type mounting bracket.

In addition, as shown in FIG. 13, the housing 220 is further constructed and arranged to define a lip 223 along a second and opposite terminal end 220B of the connector head 102. The lip 223 helps to permit removable attachment of the connector head 102 to the bracket 224. As shown in FIG. 14, the connector head 102 is attached to the bracket 224 by first aligning the connector head 102 with one of the series of openings or apertures 229 defined along the bracket 224 such that where inserted therein the ports 109 of the connector head 102 are accessible when the connector head 102 is mounted to the bracket 224. Once the connector head 102 is aligned with one of the openings or apertures 229, the lip 223 at the second terminal end 220B is mated to a portion of the bracket 224 and the connector head 102 is rotated or pivoted about the lip 223 to insert the connector head 102 into the aperture such that the tab 222 at the first terminal end 220A mates with a portion of the bracket 224.

Further, the housing 220 is constructed and arranged to define a cable entry 230 to connect the cable 104 to the connector head 102. The cable entry 230 is constructed and arranged to receive the cable 104 and to dispose the cable 104 within the cable entry 230 at an angle relative to the connector head 102 or the housing 220. In addition, the cable entry 230 is further constructed and arranged such that the cable 104 exits the cable entry 230 at an angle relative to the connector head 102 or the housing 220. As described above with reference FIGS. 4 and 8, the disposal of the cable 104 within the cable entry 230 at an angle relative to the connector head 102 or the housing 220 and/or the angled exit of the cable 104 relative to the connector head 102 or the housing 220 help the cable 104 to drape or to extend, e.g., smoothly or gradually, from the cable entry 230 and away from the connector head 102 or the housing 220 with little or no manipulation. The disposal of the cable 104 at an angle within the cable entry 230 and/or the angled exit of the cable 104 relative to the connector head 102 or the housing 220 further helps the cable 104 extend at an orientation toward one of the sides of a rack or enclosure, and/or toward a top or downward toward a bottom of a rack or enclosure. In addition, the disposal of the cable 104 within the cable entry 230 at an angle and/or the angled exit of the cable 104 relative to the connector head 102 or the housing 220 helps to further route, bundle or otherwise manage the cable 104 and helps to reduce risks of the cable 104 bending or kinking, ensuring the cable 104 remains outside of a minimum bend radius for its type.

The housing 220, as shown in FIGS. 13 and 14, is angled such that where one or more connector heads 102 are rack-mounted adjacent one another, the angled housing 220 of a first connector head 102 helps to permit the angled cable 104 of a second adjacent connector head 102 to extend past the first connector head 102 without interference from its housing 220.

As described above with reference to FIG. 14, the bracket 224 defines the series of openings or apertures 229, each sized and configured to receive at least a portion of the connector head 102 such that the tab 222 and the lip 223 mate with a portion of the bracket 224 to removably attach the connector head 102. To install the connector head 102 to the bracket 224, an end-user aligns the connector head 102 with at least a portion of an area defined by one of the openings or apertures 229, mates the lip 223 with a portion of a perimeter edge of the opening or aperture 229, rotates or pivots the lip 223 and thereby rotates or pivots the connector head 102 about the perimeter edge to permit the opening or aperture 229 to receive at least a portion of the connector head 102. The tab 222 is configured such that it biases away from an area external of the connector head 102. An end-user can then apply a pressure or force to the connector head 102 such that in response to the application of such pressure or force, the tab 222 biases inward and slides around a portion of the perimeter edge and of the opening or aperture 229 and mates with a portion of the bracket 224 to thereby attach the connector head 102. Depression of the tab 222 when the connector head 102 is attached to the bracket 224 biases the tab 222 away from the portion of the bracket 224 such that the tab 222 decouples from the bracket 224 to permit the connector head 102 to be removed.

As shown in FIG. 14, the bracket 224 further includes along each end one or more mounting holes 224', each configured to receive a fastener, e.g., a screw/nut combination, to connect the bracket 224 to each of a pair of vertical mounting flanges or rails of a rack or enclosure. The invention is not limited to the bracket 224 defining the mounting holes 224' along each end, and anticipates that the bracket 224 may include other configurations and/or arrangements to permit the bracket 224 to be removably mounted to a rack or enclosure.

Figure 15:
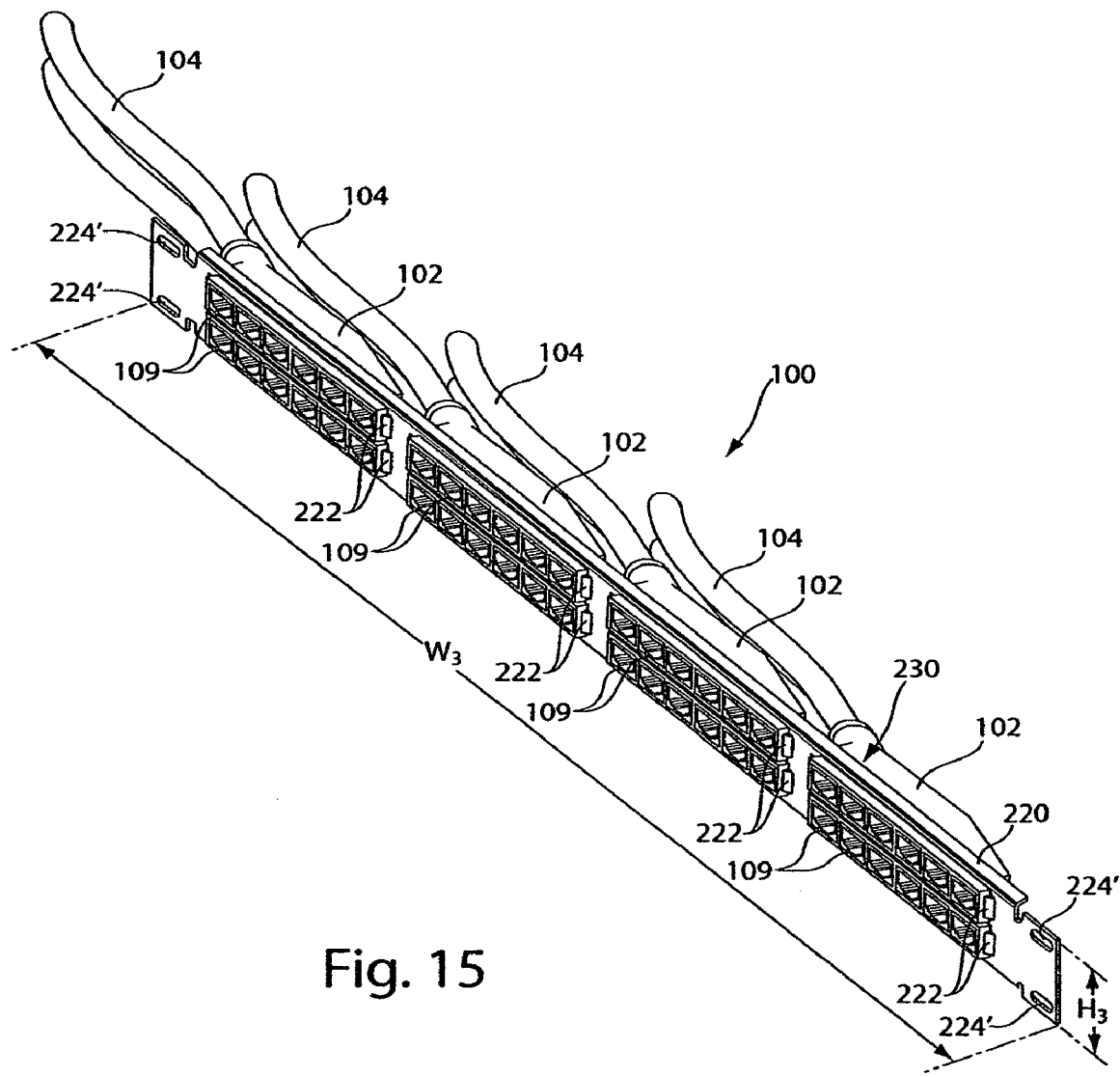
FIG. 15 is a perspective view of a plurality of cabling assemblies shown in FIG. 13 attached to a mounting bracket.

The bracket 224 is sized and configured to define a width $W_3$ and U height $H_3$ to removably attach a number of connector heads 102 to the bracket 224, depending on the configuration of each connector head 102. As noted above, the configuration of the connector head 102 depends on the type and number of the cables 104, the type and number of jacks 109A, the port 109 count and/or the conductor terminating arrangement. As shown in FIG. 14, in one configuration, the bracket 224 defines a height $H_3$ of 1 U and a width $W_3$ sufficient to removably attach up to four connector heads 102 to the bracket 224. As shown in FIG. 15, in another configuration, the bracket 224 can be constructed and arranged to define a width $W_3$ to removably attach up to eight connector heads 102 within a 1 U height $H_3$.

As the configurations of the cabling system 100 shown in FIGS. 14 and 15 indicate, the mounting bracket 224 and the connector head 102 may be constructed and arranged to removably mount to a rack or enclosure any type and number of cables 104 and any type and number of ports 109 for a particular cable installation. As shown in FIG. 15, the mounting bracket 224 having the same dimensions of a 1 U height $H_3$ and a width $W_3$ sufficient to accept up to four connector heads 102, may be constructed and arranged to accept up to eight connector heads 102. In addition, the connector head 102 may be constructed and arranged such that up to eight, rather than up to four, connector heads 102 can removably attach to the bracket 224 within the 1 U height $H_3$ and the width $W_3$ of the bracket 224 as shown. The invention is not limited to a specific configuration of the bracket 224 or of the connector head 102, and envisions that the bracket 224 and the connector head 102 may be constructed and arranged such that the connector head 102 installs any type and a number of cables 104 and defines the number of ports 109 per mounting bracket 224, as is needed or desired for a cable installation.

Figure 16:
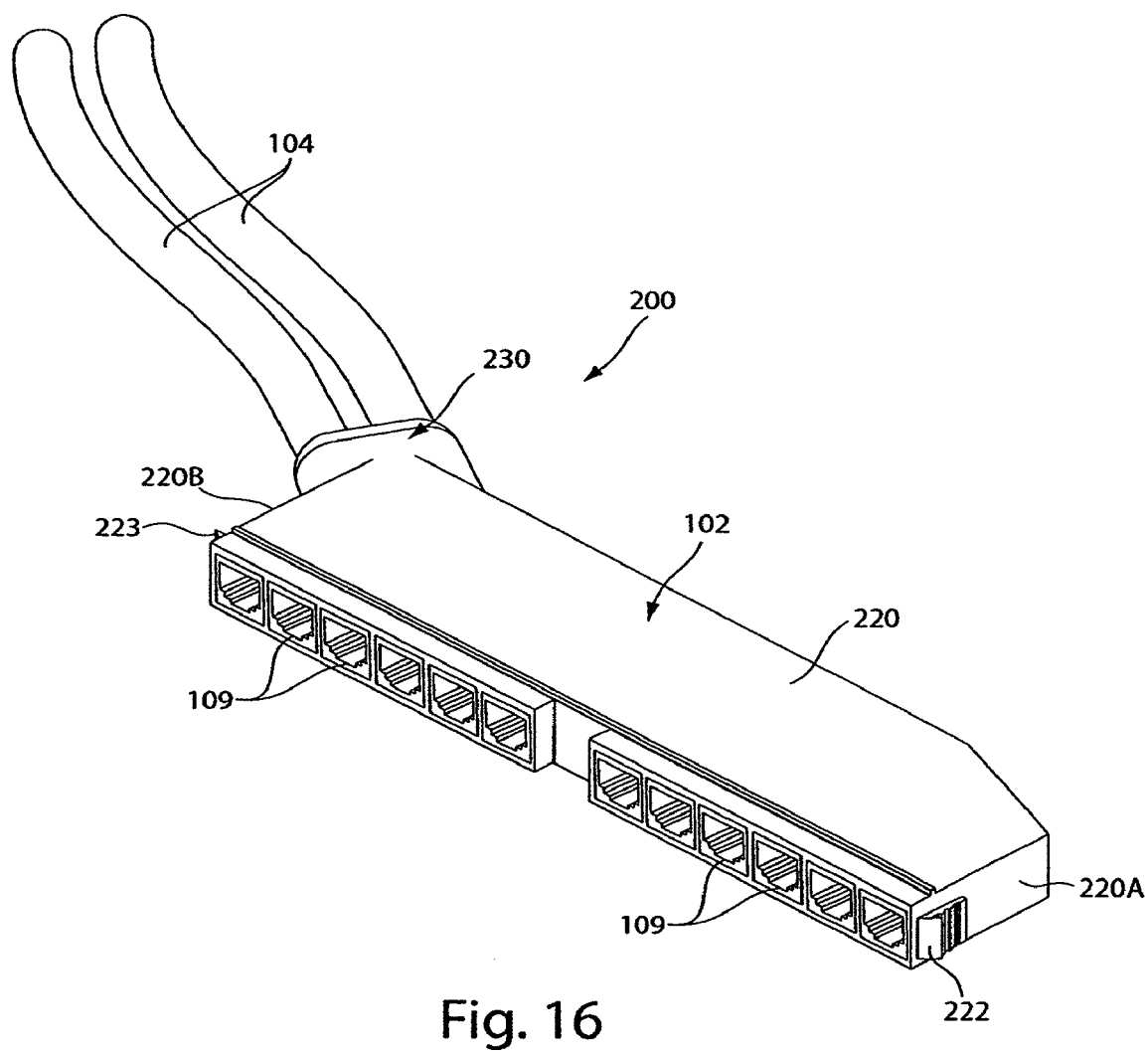
FIG. 16 is a perspective view of a further aspect of the cabling system according to the invention.
Figure 17:
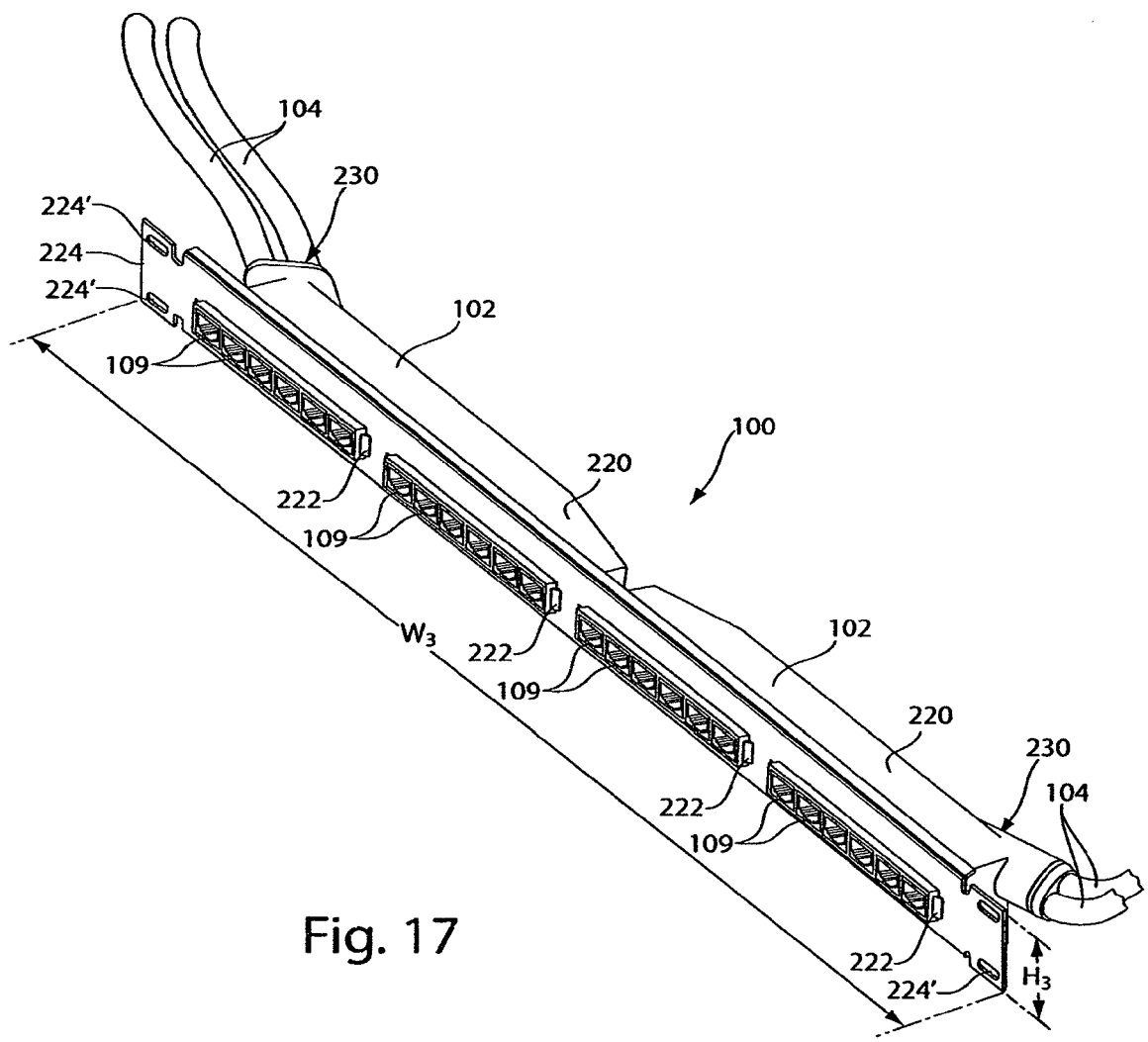
FIG. 17 is a perspective view of a plurality of cabling assemblies shown in FIG. 16 attached to a mounting bracket.
Figure 18:
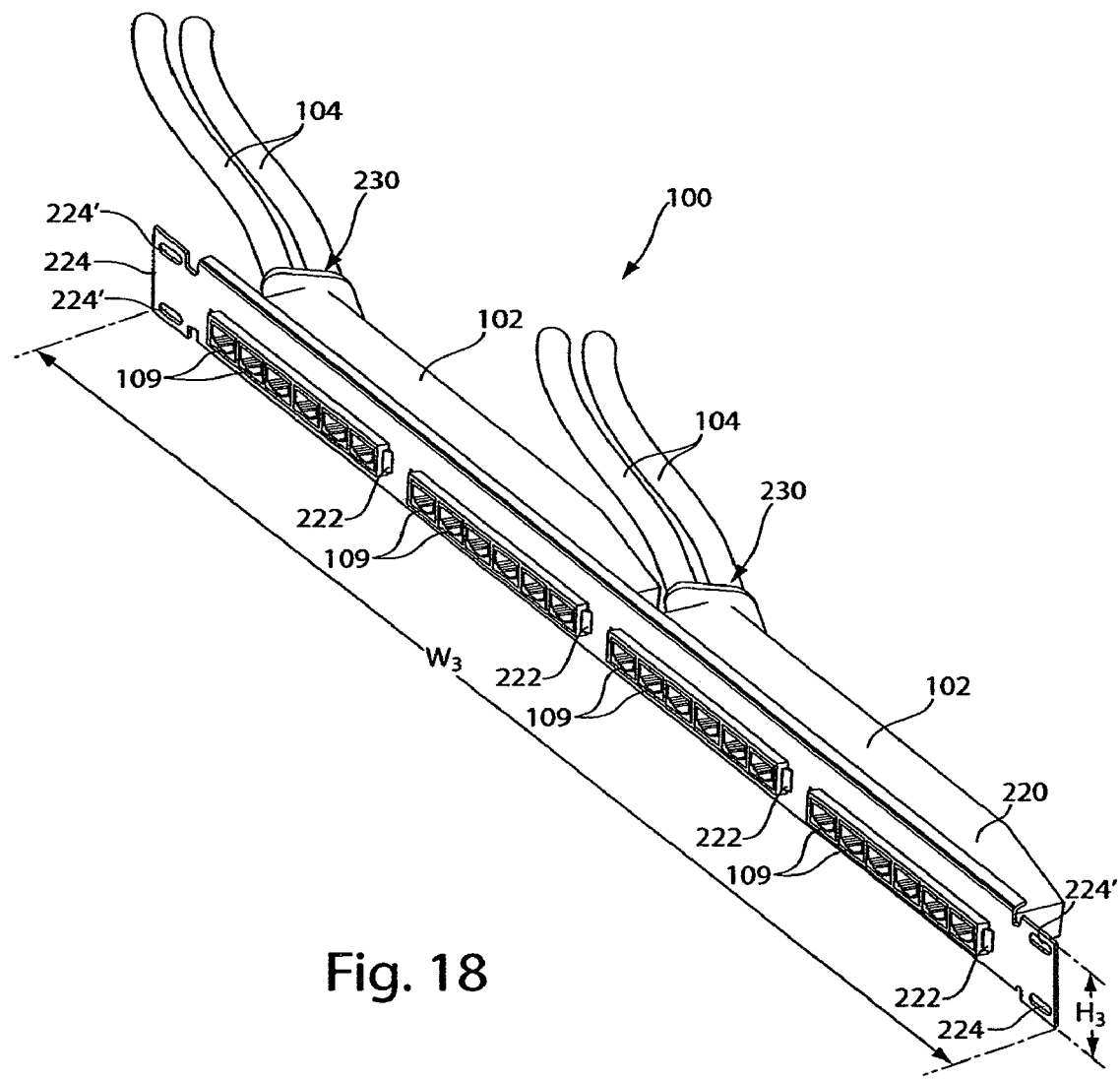
FIG. 18 is a perspective view of a plurality of cabling assemblies shown in FIG. 16 attached to a mounting bracket.

Referring to FIGS. 16-18, further configurations of the cabling system 100 and the cabling assembly 200 according to the invention are shown. As shown in FIG. 16, the cabling assembly 200 includes the connector head 102 and two cables 104 operatively connected to the connector head 102. The housing 220 of the connector head 102 is constructed and arranged to define up to twelve ports 109 and to receive the two cables 104 via the port entry 230. The first terminal end 220A of the housing 220 defines at least one tab 222 and the second terminal end 220B of the housing 220 defines at least one lip 223 to mate with the mounting bracket 224, as described above with reference to FIGS. 14 and 15.

In this case, the two cables 104 are either two individual cables 104 or two individual cables 104 bound together by a common jacket, e.g., to form a Siamese configuration. For instance, the cables 104 may each comprise twenty-four pair cable 104. The housing 220 may be constructed and arranged to operatively connect the cables 104 and to provide six 4-pair ports 109 for each cable 104 to thereby install forty-eight terminated pairs of cable conductors with a single installation of the connector head 102.

Referring to FIGS. 17 and 18, the connector head 102 with the cables 104 removably attached to the mounting bracket 224 are shown. The mounting bracket 224 includes the bracket 224 as described above with reference to FIGS. 13-15. In this case, the mounting bracket 224 may be constructed and arranged to removably mount different types or construction styles of the connector head 102. For instance, the same mounting bracket 224 may be constructed and arranged to removably mount the connector head 102 shown in FIG. 13 and the connector head 102 shown in FIG. 17 whereby the same mounting bracket 224 can accommodate each type of the angled housing 220 of each connector head 102. In addition, in another instance, the same mounting bracket 224 may be further constructed and arranged to removably mount both of the connector heads 102 shown in FIGS. 13 and 17 such that the mounting bracket 224 thereby mounts simultaneously different types of connector heads 102 in a single bracket. Such a configuration of the bracket 224 helps to optimize rack space and helps to accommodate a rack or enclosure having a mix of different applications and different types of equipment components.

With further reference to FIGS. 17 and 18, the connector head 102 defines the cable entry 230 having a construction and an arrangement that permits the cable 104 to be disposed within the cable entry 230 at an angle, e.g., less than 90 degrees or an acute angle, relative to the connector head 102 or the housing 220. In addition, as also described above, the cable entry 230 is constructed and arranged to permit the cable 104 to exit from the entry 230 at an angle, e.g., less than 90 degrees or an acute angle, relative to the connector head 102 or the housing 103 to permit the cable 104 to extend, e.g., gradually or smoothly, away from the connector head 102 and toward a left or right side of a rack or enclosure, or toward a top or bottom of a rack or enclosure, or other direction with little or no manipulation. As shown in FIGS. 17 and 18, the cables 104 can extend from the connector heads 102 in the same direction or each of the cables 104 for each connector head 102 can extend in opposite directions. The invention is not limited to the connector head 102 and the bracket 224 shown in FIGS. 16-18, and anticipates that the connector head 102 may be constructed and arranged to operatively connect other cable 104 arrangements and port counts, and that the bracket 224 may be constructed and arranged to removably attach different configurations of the connector head 102.

Figure 19A:
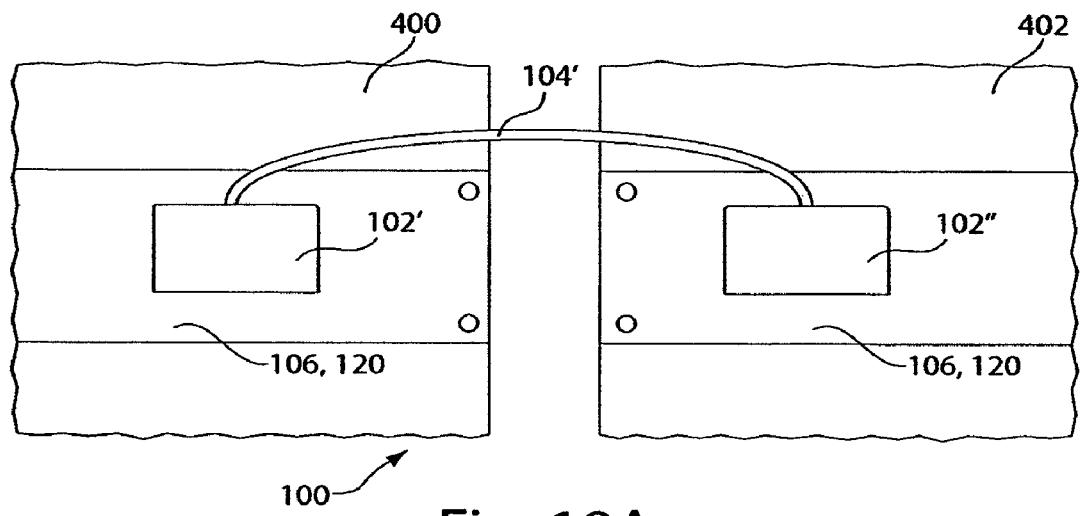
FIG. 19A is a schematic diagram of the cabling system shown in FIG. 2 used to configure an inter-rack cable installation.
Figure 19B:
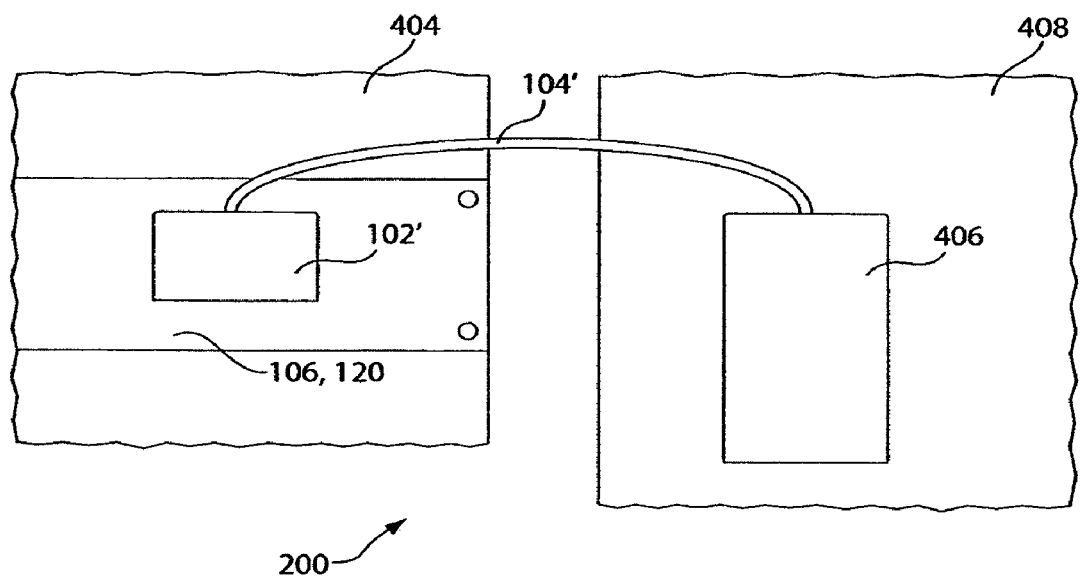
FIG. 19B is a schematic diagram of the cabling system shown in FIG. 2 used to configure a cable installation.
Figure 19C:
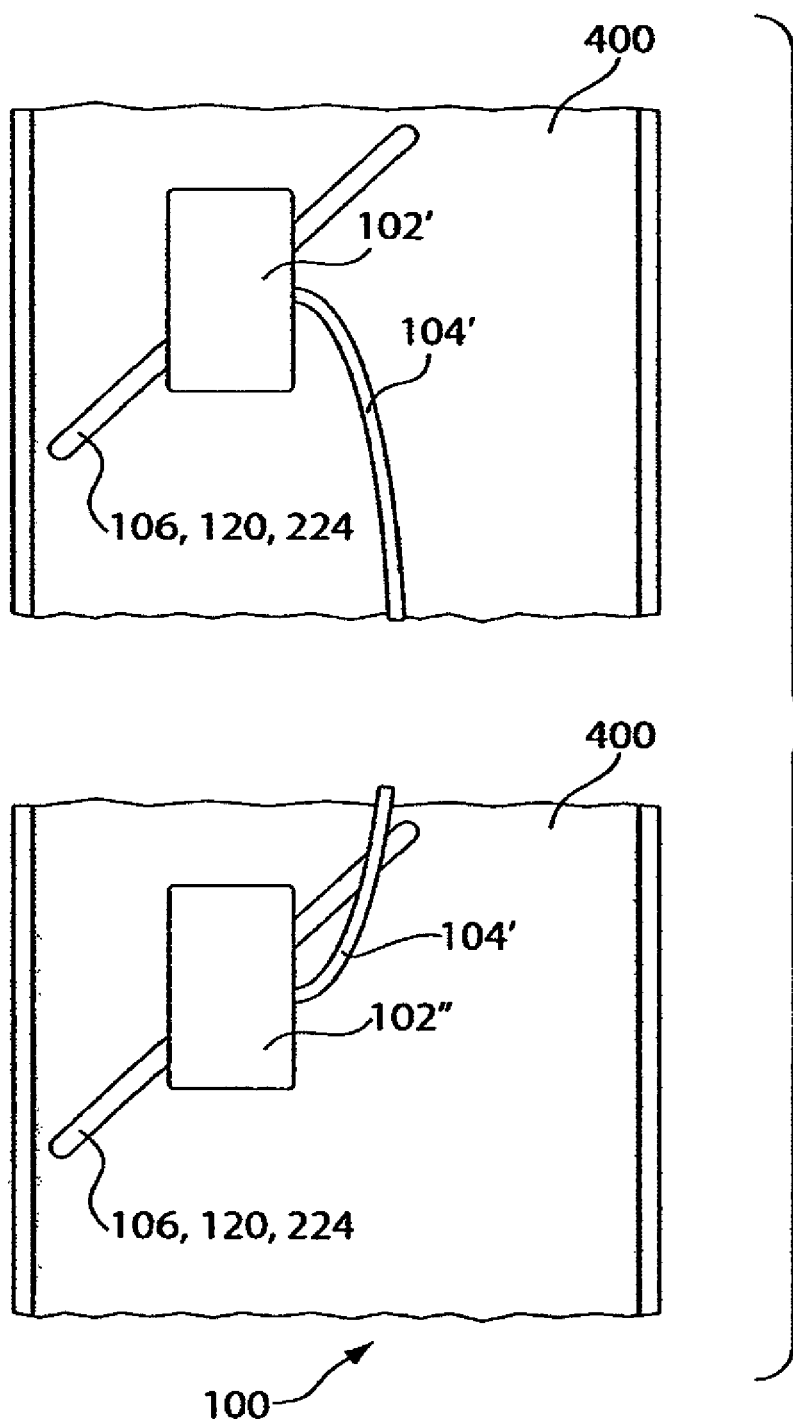
FIG. 19C is a schematic diagram of the cabling system shown in FIG. 2 used to configure a intra-rack cable installation.

Referring to FIGS. 19A-19C, the cabling system 100 according to the invention defines and arranges intra-rack, inter-rack and other cable installation configurations. For instance, in one configuration, the cabling system 100 can configure an inter-rack cable installation whereby the cabling system 100 provides rack-to-rack connections between a first rack or enclosure 400 such as, for instance, a telecommunications distribution rack, and a second rack or enclosure 402, such as a server rack. As shown in FIG. 19A, in one rack-to-rack configuration, the cabling assembly 200 including the connector head 102' and at least one cable 104' is rack-mounted either horizontally or vertically to a first distribution rack 400 via one of the mounting brackets 106, 120 and 224 described above. A second connector head 102" is rack-mounted horizontally or vertically to a second server rack 402 via one or the mounting brackets 106, 120 and 224. The cable 104' extends from the first connector head 102' to the second connector head 102" to operatively connect the connector heads 102' and 102" and thereby the server rack 402 with the distribution rack 400 to enable signal propagation between servers mounted in the server rack 402 and telecommunications components mounted in the distribution rack 400.

In another configuration, the cabling system 100 can configure cable of an equipment room or data center whereby the cabling system 100 provides connections between a rack or enclosure 404 and another device 408 such as, for instance, a switch, a router, a telephone connection or an Ethernet or other network device. As shown in FIG. 19B, in one configuration, the cabling assembly 200 including the connector head 102' and at least one cable 104' is rack-mounted either horizontally or vertically to an equipment rack or enclosure 404 via one of the mounting brackets 106, 120 and 224 described above. The cable 104' extends from the connector head 102' to a termination assembly 406. The termination assembly 406 is configured to terminate all pairs of conductors of the cable 104'. Conductor pairs of the cable 104' may be grouped and terminated into a different number of ports of the termination assembly 406 than the number of ports comprising the plurality of ports 109 of the connector head 102. In another configuration, conductor pairs of the cable 104' may be terminated into the same number of ports of the termination assembly 406 as the number of ports comprising the plurality of ports 109 of the connector head 102 having a different physical arrangement. For instance, in a networking application, the termination assembly 406 may include an RJ-21 connector operatively connected the cable 104' to connect the cable 104' to a networking switch 408.

Referring to FIG. 19C, in still a further configuration, cabling system 100 according to the invention defines and arranges an intra-rack cable installation. In this case, an equipment rack or enclosure 400 can include a first connector head 102' and a second connector head 102", each connector head 102' and 102" removably mounted to the rack or enclosure 400 via the bracket 106, 120 and 224. In one configuration, the first and the second connector heads 102' and 102" may be removably attached to the same bracket 106, 120 and 224. In another configuration, as shown in FIG. 19C, each of the first and the second connector heads 102' and 102" may be removably attached to separate brackets 106, 120 and 224, e.g., disposed at different locations within the rack or enclosure 400. The cable 104' extends between the first connector head 102' and the second connector head 102" to enable equipment components connected to one of the connector heads 102' and 102" to propagate signals.

Figure 20A:
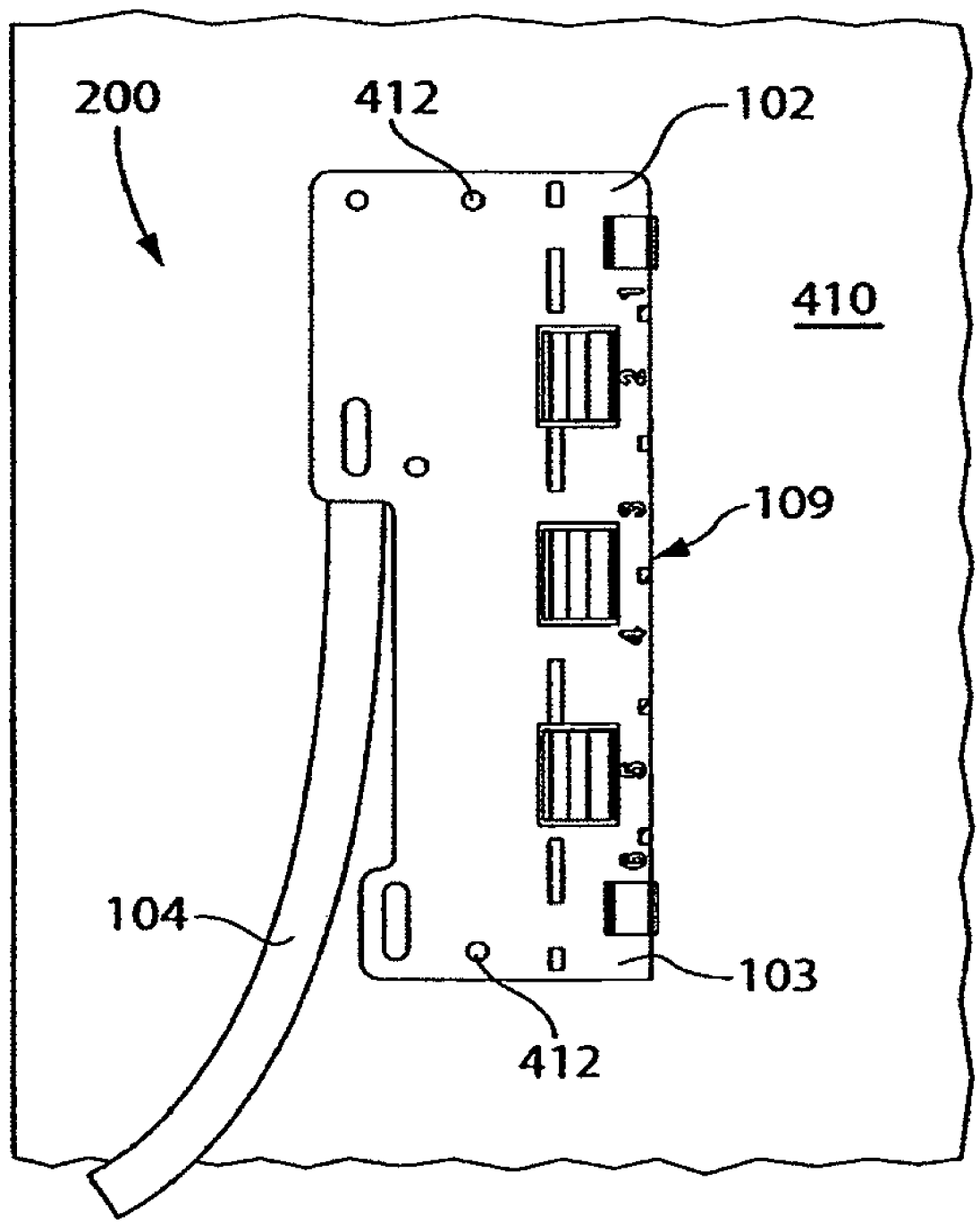
FIG. 20A is a schematic diagram of a wall-mounted configuration of the cabling assembly shown in FIG. 2.

Referring to FIG. 20A, as noted above, the cabling assembly 200 can be configured for wall-mounting applications within an equipment room or data center whereby the connector head 102 and the at least one cable 104, as described above with reference to FIGS. 2 and 4, are configured for mounting to a wall of an equipment room or data center to provide service connections for one or more racks or enclosures. As shown in FIG. 20A, the connector head 102 is mounted to a wall 410 located within an equipment room or data center via one or more through holes 412 defined in the housing 103 of the connector head 102. The through holes 412 are configured to accept one or more fasteners (not shown), e.g., screws, and to enable the fasteners to extend therethrough to the wall 410 to permit the cabling assembly 200 to be attached to the wall 410. The plurality of ports 109 (not shown) of the connector head 102 are disposed such that each port 109 is accessible to receive connective wiring of equipment components to thereby connect the components to the cable 104.

Figure 20B:
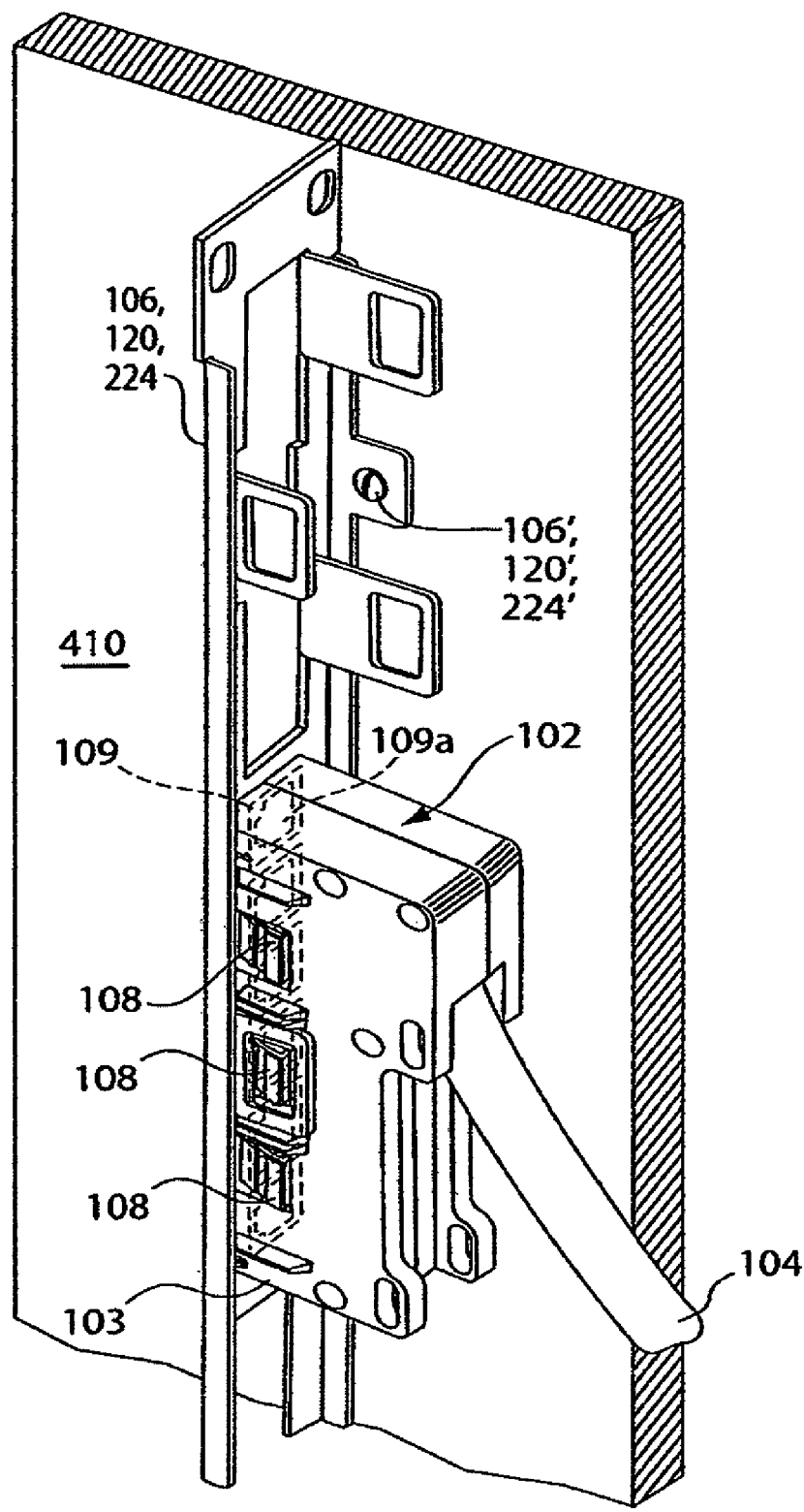
FIG. 20B is a schematic diagram of a wall-mounted configuration of the cabling assembly shown in FIG. 2 using a mounting bracket.

Referring to FIG. 20B, in an alternative configuration, the mounting bracket 106, 120 and 224 described above for either a horizontal or vertical application may be further configured or modified for wall-mounting applications. For instance, the mounting bracket 106, 120 and 224 can define one or more mounting holes 106', 120' and 224' sized and disposed along the bracket 106, 120 and 224 to receive one or more fasteners, e.g., screws, to attach the mounting bracket 106, 120 and 224 to a wall 410 to thereby permit one or more connector heads 102 to be wall-mounted.

Figure 21:
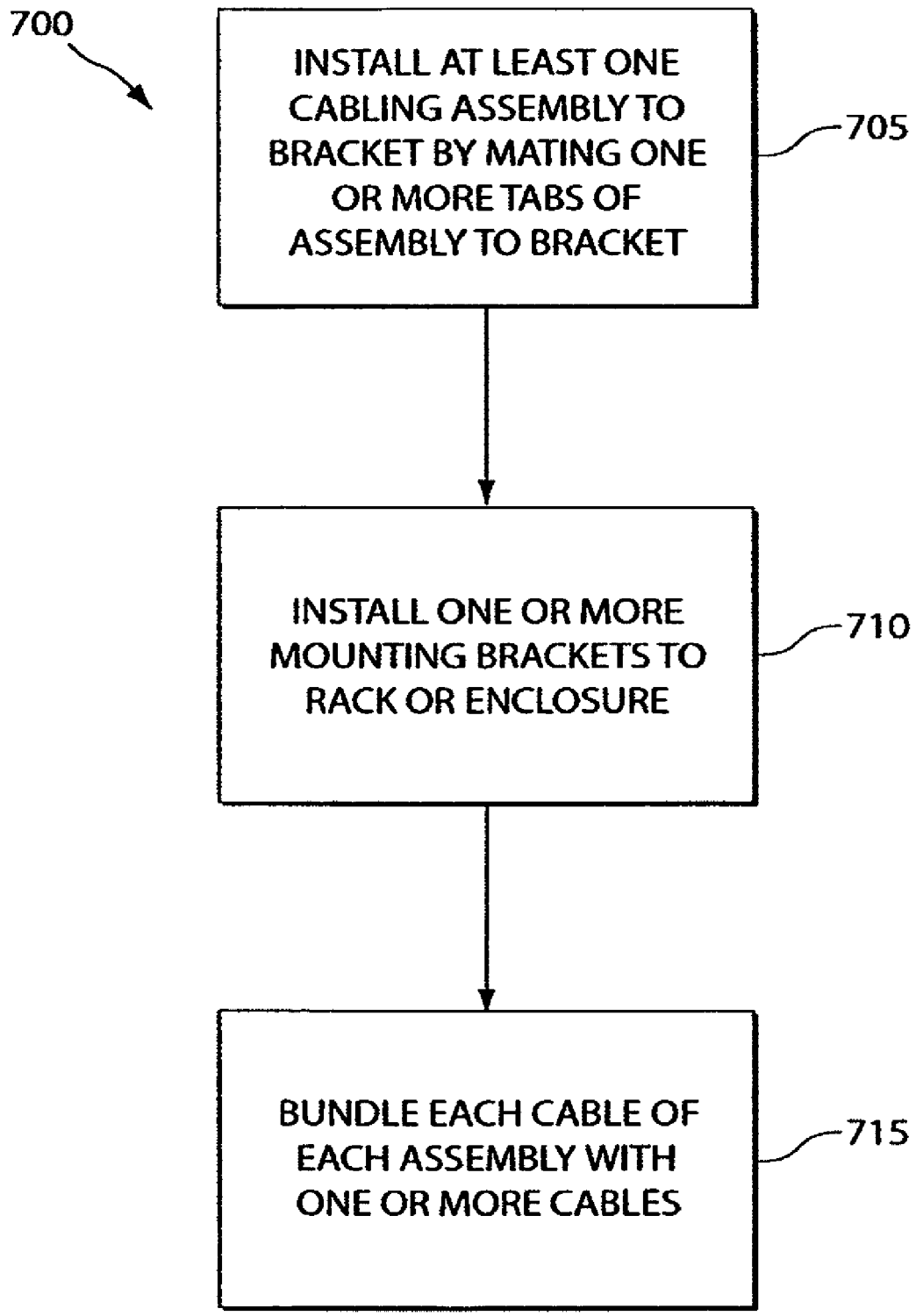
FIG. 21 is a flow diagram of a method of installing the cable system shown in FIGS. 2, 9 and 13-18 using one or more of mounting brackets shown in FIGS. 2, 8-10 and 14-18.

Referring to FIG. 21, the invention further provides a method 700 for installing cable to an equipment rack or enclosure using the cabling assembly 200 or the cabling system 100 and includes the stages shown. The method 700, however, is exemplary only and not limiting. The method 700 can be altered, e.g., by having stages added, removed, and/or rearranged.

At stage 705, one or more of the cabling assemblies 200 are installed in the mounting bracket 106, 120 and 224. Each cabling assembly 200 is attached to the mounting bracket 106, 120 and 224, e.g., by mating one or more of the tabs 108 disposed along the housing 103 of the connector head 102 or one or more of the tabs 222 disposed along a terminal end of the housing 103 of the connector head 102 with one or more of the mounting apertures 113, 124 and 229 defined in the mounting flanges 112 and 122 or the bracket 106, 120 and 224. Alternatively, each cabling assembly 200 is attached to the mounting bracket 106, 120 and 224 by mating one or more mounting configurations disposed along the housing 103 of the connector head 102 or defined within the connector head 102 with one or more complementary mounting configurations disposed along or defined in the mounting bracket 106, 120 and 224. Cables 104 may be bundled prior to mounting the bracket 106, 120 and 224.

At stage 710, the mounting bracket 106, 120 and 224 is installed in an equipment rack or enclosure or is wall-mounted. The mounting bracket 106, 120 and 224 is attached to the equipment rack or enclosure, e.g., by attaching the mounting bracket 106 and 224 horizontally between a pair of vertical adjacent mounting flanges or rails of the rack or enclosure or by mounting the mounting bracket 120 vertically along a panel or other structure of the rack or enclosure disposed, for instance, along zero U space of the rack or enclosure. The mounting bracket 106, 120 and 224 is wall-mounted with each of one or more mounting holes 106', 120' and 224' defined along the mounting bracket 106, 120 and 224 receiving a fastener, e.g., a screw, to attach the bracket 106, 120 and 224 to a wall 410.

At stage 715, the cables 104 of the bracket-mounted cabling assemblies 200 may be further bundled, routed and managed. One or more cables 104 are bundled, e.g., by wrapping a cable tie around one or more adjacent and proximate cables 104 and inserting the cable tie through one or more slots 117 defined in one or more housings 103, to support and to secure the cables 104 of adjacent and proximate connector heads 103.

Other embodiments are within the scope of the appended claims. For example, the connector head 102 is constructed and arranged without the cable 104 and provides the cable entry 105 to accept a cable, e.g., an end-user specified or provided cable, for on-site termination to the connector head 102.

In another example, the cabling assembly 200 according to the invention is constructed and arranged to provide the connector head 102 with the attached cable 104 for removable attachment to one or more preexisting or preinstalled mounting brackets of an equipment rack or enclosure, such as horizontal brackets, vertical brackets or rack-top brackets.

In a further example, the mounting bracket 106 and 120 is constructed and arranged such that the bracket 106 and 120 includes a front surface panel configured to help to provide an attractive aesthetic appearance to the bracket 106 and 120 and/or the connector head 102 and the plurality of ports 109 where the bracket 106 and 120 and the connector head 102 are attached and are rack-mounted. The surface panel may include a numbering, design and/or color scheme to help to label each port 109 for port identification purposes. In addition, the surface panel may be constructed of a material to permit adhesive labels to be affixed to the panel, or to provide a write-on/erasable surface to be marked for port identification purposes.

In another example, the cable 104 of the cabling assembly 200 includes a fiber optic cable 104. In this application, the connector head 102 is constructed and arranged to provide a certain number of ports 109 as is required or desired to enable signal propagation of the fiber optic cable 104, as well as to house an internal termination arrangement to accommodate the fiber optic cable 104. For instance, in one configuration, the connector head 102 includes an internal interface to operatively connect the fiber optic cable 104 to one or more jacks such that the cable 104 is operatively connected to each port 109.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A cabling assembly for use with an equipment enclosure, the cabling assembly comprising:
    a mounting bracket configured to be secured to the equipment enclosure, the mounting bracket including:
        a body having a plurality of mounting apertures formed therein; and
        a plurality of flanges disposed along an edge of the body;
    a plurality of connector heads, each connector head including:
        a housing defining a jack entry side, a cable entry side disposed opposite the jack entry side and a plurality of tabs configured to engage the plurality of flanges to provide removable and tool-less installation of the housing to the mounting bracket; and
        a plurality of ports disposed along the jack entry side of the housing, the housing being configured to locate the plurality of ports through the one of the plurality of mounting apertures, each port of the plurality of ports being configured to accept connective wiring of rack-mounted equipment and to internally terminate at least one workpiece cable within the housing; and
    at least one cable entry defined along the cable entry side of the housing, the at least one cable entry being configured to receive and to dispose the at least one workpiece cable such that the at least one workpiece cable enters the housing at an angle of less than 90 degrees defined between an outer surface of the at least one workpiece cable and an external surface of the housing along the cable entry side.

2. The assembly of claim 1 wherein the plurality of flanges of the mounting bracket and the plurality of tabs of each connector head of the plurality of connector heads are disposed symmetrically relative to one another along the housing of each connector head to permit reverse installation of each connector head to the mounting bracket.

3. The assembly of claim 1 wherein the plurality of flanges of the mounting bracket and the plurality of tabs of each connector head of the plurality of connector heads are disposed symmetrically relative to one another within the housing of each connector head to permit reverse installation of each connector head to the mounting bracket.

4. The assembly of claim 1 wherein the mounting bracket is further configured to removably attach to at least one equipment enclosure in at least one orientation selected from the group comprising a horizontal orientation and a vertical orientation.

5. The assembly of claim 1 wherein the mounting bracket is configured to removably attach to a wall to permit removable and tool-less installation of the connector head to the wall.

6. The assembly of claim 1 wherein the mounting bracket is configured to removably attach to at least one of an equipment rack and a wall and to permit removable and tool-less installation of the connector head to the mounting bracket.

7. The assembly of claim 1 wherein the mounting bracket is further configured to removably mount to the equipment enclosure.

8. The assembly of claim 1 wherein the housing further defines at least one slot, the at least one slot being configured to receive at least a portion of a fastener configured to support the at least one workpiece cable, the at least one slot being disposed to permit the fastener to secure at least a portion of the at least one workpiece cable adjacent and proximate to the connector head.

9. The assembly of claim 1 wherein the housing is further configured to removably attach to a wall.

10. The assembly of claim 1 wherein the connector head is sized and is configured such that up to four of the cabling assemblies removably attach to a mounting bracket.

11. The assembly of claim 1 wherein the plurality of ports includes six ports.

12. The assembly of claim 1 wherein the mounting bracket defines a height of 1U.

13. The assembly of claim 1 further comprising a conductor termination arrangement disposed internally within the housing, the conductor termination arrangement including at least one jack mounted internally within the housing such that at least one pair of conductors of the at least one workpiece cable connect internally to the at least one jack.

14. The assembly of claim 1 further comprising a conductor termination arrangement disposed internally within the housing, the conductor termination arrangement including at least one jack operatively connected to at least one printed circuit board, the at least one printed circuit board mounted internally within the housing such that at least one pair of conductors of the at least one workpiece cable connect internally to the at least one printed circuit board.

15. The assembly of claim 1 wherein the cable entry further disposes the at least one workpiece cable such that the at least one workpiece cable extends from the housing in either a substantially leftward orientation or a substantially rightward orientation relative to the housing.

16. The assembly of claim 15 wherein the cable entry further disposes the at least one workpiece cable such that when the at least one workpiece cable extends from the housing the at least one workpiece cable is disposed at a radius greater than a minimum bend radius for a type of the at least one workpiece cable.

17. A prefabricated cabling assembly for use in an equipment rack or enclosure, the assembly comprising:
    a mounting bracket configured to be secured to the equipment rack or enclosure, the mounting bracket including:
        a body having a plurality of mounting apertures formed therein; and
        a plurality of flanges disposed along an edge of the body;
    a plurality of connector heads, each connector head operatively connectable to at least one workpiece cable, each connector head including:
        a housing defining a jack entry side, a cable entry side disposed opposite the jack entry side and a plurality of tabs configured to engage the plurality of flanges to provide removable and tool-less installation of the housing to the mounting bracket; and a plurality of ports disposed along the jack entry side of the housing, the housing being configured to locate the plurality of ports through the one of the plurality of mounting apertures, each port of the plurality of ports being configured to accept connective wiring of rack-mounted equipment;

at least one cable entry defined along the cable entry side of the housing, the at least one cable entry being configured to receive and to dispose the at least one workpiece cable such that the at least one workpiece cable enters the housing at an angle of less than 90 degrees defined between an outer surface of the at least one workpiece cable and an external surface of the housing along the cable entry side; and a conductor termination arrangement contained internally within the housing, the conductor termination arrangement being configured and disposed to internally terminate the at least one workpiece cable within the housing and to operatively couple internally to the plurality of ports.

18. The assembly of claim 17 wherein the conductor termination arrangement is factory-terminated and factory-tested.

19. The assembly of claim 17 wherein the cable entry further disposes the at least one workpiece cable such that the at least one workpiece cable extends from the housing in either a substantially leftward orientation or a substantially rightward orientation relative to the housing.

20. The assembly of claim 19 wherein the cable entry further disposes the at least one workpiece cable such that when the at least one workpiece cable extends from the housing the at least one workpiece cable is disposed at a radius greater than a minimum bend radius for a type of the at least one workpiece cable.

21. The assembly of claim 19 wherein the cable entry further disposes the at least one workpiece cable such that when the at least one workpiece cable extends from the housing the at least one workpiece cable is disposed at a radius greater than a minimum bend radius for a type of the at least one workpiece cable.

22. A cabling kit for use in installing cable for an equipment rack or enclosure, the cabling kit comprising:

a mounting bracket configured to be secured to the equipment rack or enclosure, the mounting bracket including:
a body having a plurality of mounting apertures formed therein; and
a plurality of flanges disposed along an edge of the body;

a plurality of connector heads, each connector head operatively connectable to at least one workpiece cable, each connector head including:

a housing defining a jack entry side, a cable entry side disposed opposite the jack entry side and a plurality of tabs configured to engage the plurality of flanges to provide removable and tool-less installation of the housing to the mounting bracket; and a plurality of a plurality of ports disposed along the jack entry side of the housing, the housing being configured to locate the plurality of ports through the one of the plurality of mounting apertures, each port of the plurality of ports being configured to accept connective wiring of rack-mounted equipment and to internally terminate the at least one workpiece cable within the housing; and at least one cable entry defined along the cable entry side of the housing, the at least one cable entry being configured to receive and to dispose the at least one workpiece cable such that the at least one workpiece cable enters the housing at an angle of less than 90 degrees defined between an outer surface of the at least one workpiece cable and an external surface of the housing along the cable entry side.

23. The kit of claim 22 wherein the cable entry further disposes the at least one workpiece cable such that the at least one workpiece cable extends from the housing in either a substantially leftward orientation or a substantially rightward orientation relative to the housing.

24. The kit of claim 23 wherein the cable entry further disposes the at least one workpiece cable such that when the at least one workpiece cable extends from the housing the cable is disposed at a radius greater than a minimum bend radius for a type of the at least one workpiece cable.

* * * * *